(12) United States Patent
Filsfils et al.

(10) Patent No.: US 9,912,577 B2
(45) Date of Patent: Mar. 6, 2018

(54) SEGMENT ROUTING—EGRESS PEER ENGINEERING (SP-EPE)

(71) Applicant: Cisco Technology, Inc., San Jose, CA (US)

(72) Inventors: Clarence Filsfils, Brussels (BE); Keyur P. Patel, San Jose, CA (US); David D. Ward, Los Gatos, CA (US); Pierre Jean Rene François, Madrid (ES); Stefano B. Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 400 days.

(21) Appl. No.: 14/637,510

(22) Filed: Mar. 4, 2015

(65) Prior Publication Data
US 2015/0304206 A1    Oct. 22, 2015

Related U.S. Application Data

(60) Provisional application No. 61/980,689, filed on Apr. 17, 2014, provisional application No. 61/993,348, filed on May 15, 2014.

(51) Int. Cl.
*G06F 15/173* (2006.01)
*H04L 12/715* (2013.01)

(52) U.S. Cl.
CPC .............. *H04L 45/04* (2013.01); *H04L 45/46* (2013.01)

(58) Field of Classification Search
None
See application file for complete search history.

(56) References Cited

U.S. PATENT DOCUMENTS

| | | | | |
|---|---|---|---|---|
| 8,456,987 B1 * | 6/2013 | Valluri | ................... | H04L 45/00 370/230 |
| 8,537,840 B1 * | 9/2013 | Raszuk | ................... | H04L 45/04 370/351 |
| 9,124,652 B1 * | 9/2015 | Jain | ....................... | H04L 67/327 |
| 2002/0103631 A1 * | 8/2002 | Feldmann | ............... | H04L 41/12 703/22 |
| 2003/0039212 A1 * | 2/2003 | Lloyd | ................. | H04L 41/0823 370/235 |
| 2005/0073958 A1 * | 4/2005 | Atlas | ...................... | H04L 45/00 370/238 |
| 2007/0064715 A1 * | 3/2007 | Lloyd | ................. | H04L 41/0816 370/401 |
| 2010/0195516 A1 * | 8/2010 | McReynolds | ....... | H04L 43/0876 370/252 |
| 2010/0241742 A1 * | 9/2010 | Douceur | ............... | H04L 65/403 709/224 |
| 2011/0286326 A1 | 11/2011 | Awano | | |

OTHER PUBLICATIONS

Previdi et al., "Segment Routing Egress Peer Engineering BGPLS Extensions", Network Working Group Internet—Draft, <draft-previdi-idr-bgpls-segment-routing-epe-01>, Oct. 25, 2014, 16 pages, Internet Engineering Task Force Trust.
Rekhter et al.,"Carrying Label Information in BGP-4", Request for Comments 3107, May 2001, 8 pages, The Internet Society.
Extended European Search Report and European Search Opinion dated Sep. 10, 2015 in connection with European Application No. 15160384.1.

* cited by examiner

*Primary Examiner* — Brian Whipple
(74) *Attorney, Agent, or Firm* — Parker Ibrahim & Berg LLC; James M. Behmke; Stephen D. LeBarron

(57) ABSTRACT

In one embodiment, a controller device in a computer network domain learns border gateway protocol (BGP) egress peering segments from one or more border routers of the domain, and determines a selected flow to segment route via a particular egress peering segment, the selected flow from a given routing device within the domain to a given destination of a remote domain. As such, the controller device may then instruct the given routing device to segment route the selected flow via the particular egress peering segment. In another embodiment, an egress border router shares its BGP egress peering segments, and receives a flow to segment route. The egress border router may determine, from a segment route contained within the flow, to which particular egress peering segment of the border router to segment route the flow, and forwards the flow out of the domain via the particular egress peering segment.

21 Claims, 20 Drawing Sheets

TABLE 300 (E.G., SRGB)

| INCOMING LABEL 305 | OPERATION 310 | OUTGOING INTERFACE 315 |
|---|---|---|
| 9001 | POP | LOADBALANCE ON ANY LINK TO D |
| 9002 | POP | SPECIFIC LINK TO D |
| 9003 | POP | LOADBALANCE ON ANY LINK TO H |
| 9004 | POP | SPECIFIC LINK TO H |
| 9005 | POP | LOADBALANCE ON ANY LINK TO E |
| 9006 | POP | SPECIFIC LINK 1 TO E |
| 9007 | POP | SPECIFIC LINK 2 TO E |
| 9008 | POP | LOADBALANCE ON ANY LINK TO AS3 (H OR E) |
| 9009 | POP | LOADBALANCE ON ANY LINK TO AS2 (D) |

ENTRIES 320

FIG. 3

SEGMENT ROUTING—EGRESS PEER ENGINEERING (SP-EPE)

RELATED APPLICATIONS

The present application claims priority to U.S. Provisional Application No. 61/980,689, filed by Filsfils, et al. on Apr. 17, 2014, entitled SEGMENT ROUTING EGRESS PEER ENGINEERING, and U.S. Provisional Application No. 61/993,348, filed by Filsfils, et al. on May 15, 2014, entitled SEGMENT ROUTING EGRESS PEER ENGINEERING, the contents of each of which are incorporated herein by reference.

TECHNICAL FIELD

The present disclosure relates generally to computer networks, and, more particularly, to segment routing-egress peer engineering (SP-EPE).

BACKGROUND

In computer networking, exterior gateway protocols may be used to exchange routing and reachability information between autonomous systems (ASes) on the Internet. One example standardized exterior gateway protocol is the Border Gateway Protocol (BGP), often classified as either a path vector protocol or a distance-vector routing protocol. BGP generally makes routing decisions based on paths, network policies, or rule-sets configured by a network administrator, and is involved in making core routing decisions.

In many network configurations, an AS (or other type of routing domain) may learn several paths to a particular destination address or address prefix. For example, many ASes have multiple border routers (BRs or ASBRs, also sometimes referred to as provider edge devices or "PEs") that may each provide a valid path to the same destination(s). Alternatively or in addition, certain BRs may also individually have multiple valid paths to the same destination(s), such as where a single BR connects to multiple other BRs or has multiple connections to a same adjacent BR. The BGP protocol has typically handled multiple AS egress options by using "best path selection" techniques to choose one (or more) particular egress routes. However, finer grained control and external influence to this egress route selection has yet to be developed.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 3 illustrates an example forwarding table;

DESCRIPTION OF EXAMPLE EMBODIMENTS

Overview

Figure 1:
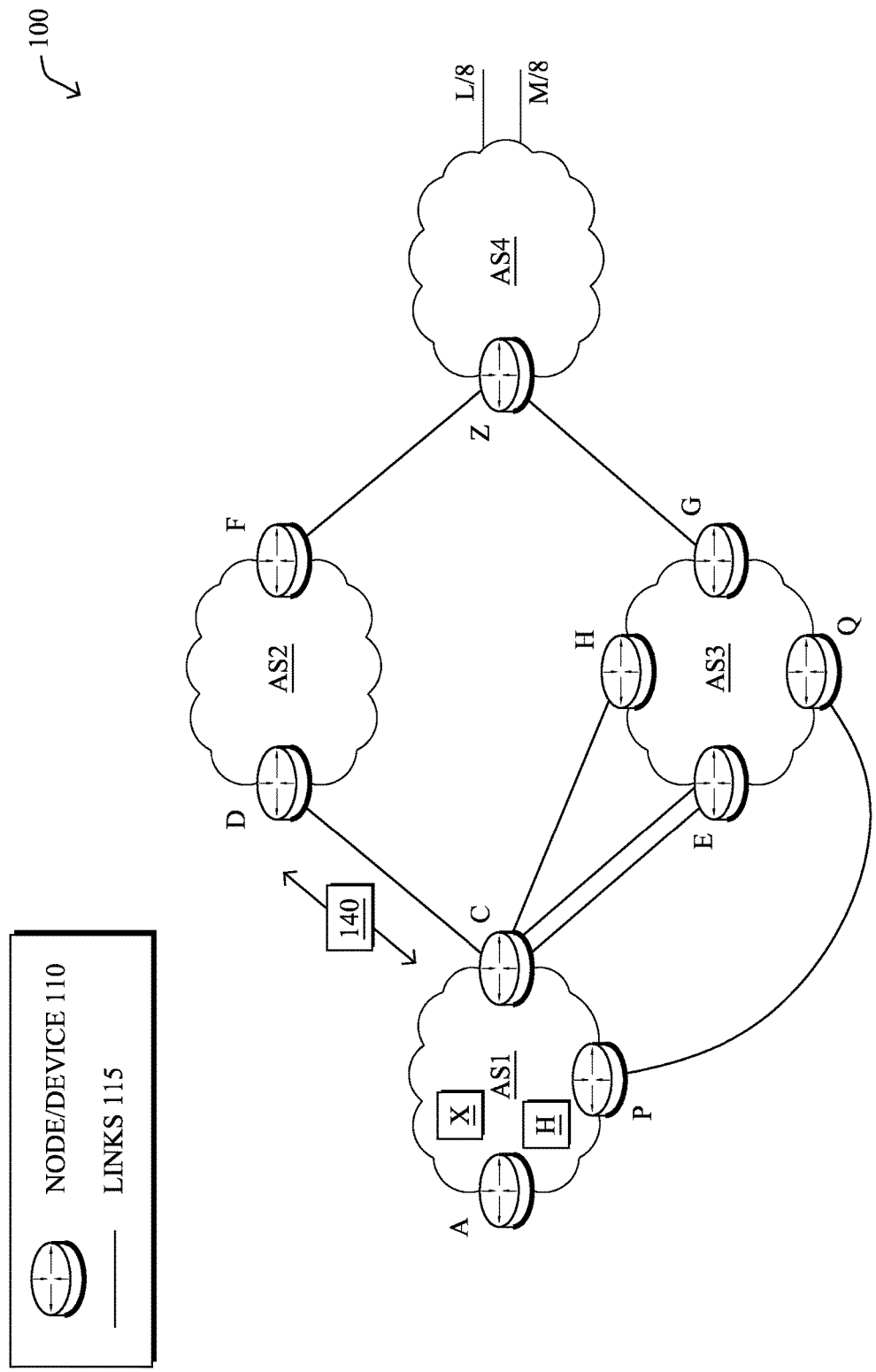
FIG. 1 illustrates an example communication network.

According to one or more embodiments of the disclosure, a controller device in a computer network domain learns border gateway protocol (BGP) egress peering segments from one or more border routers of the domain, and determines a selected flow to "segment route" via a particular egress peering segment, the selected flow from a given routing device within the domain to a given destination of a remote domain. As such, the controller device may then instruct the given routing device to segment route the selected flow via the particular egress peering segment.

According to one or more additional embodiments of the disclosure, an egress border router shares its BGP egress peering segments with a controller device of the domain, and may later receive a flow to segment route. In response, the egress border router may determine, from a segment route contained within the flow, to which particular egress peering segment of the border router to segment route the flow (e.g., steer the selected flow via the particular egress peering, using the corresponding egress peering segment), and forwards the flow out of the domain via the particular egress peering segment of the border router, accordingly.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 is a schematic block diagram of an example simplified computer network 100 illustratively comprising nodes/devices, such as a plurality of routers/devices 110 interconnected by links 115 or networks, as shown. For example, network 100 may illustrate a WAN comprising a plurality of service provider networks or autonomous systems, AS1, AS2, AS3, and AS4, where provider edge (PE) devices may allow for communication between various networks (e.g., with other PEs or customer edge (CE) devices, ASBRs generally). Illustratively, AS1 comprises PE devices A, C, and P, AS2 comprises PE devices D and F, AS3 comprises PE devices H, G, and Q, and AS4 comprises PE device Z, each interconnected as shown. As described below, from the perspective of one particular direction of a packet flow, a PE device may be an ingress PE (iPE) or an egress PE (ePE). Within each AS may be a core network (e.g., via provider or "P" core devices). Particularly illustrated within AS1 are an illustrative content source/host device H, and an illustrative centralized controller device X. Further, within and/or reachable via AS4 are IP prefixes L/8 and M/8.

Those skilled in the art will understand that any number of nodes, devices, links, etc. may be used in the computer network, and that the view shown herein is for simplicity. Those skilled in the art will also understand that while the embodiments described herein is described generally, it may apply to any network configuration within an Autonomous System (AS) or area, or throughout multiple ASes or areas, across a WAN (e.g., the Internet), etc.

Data packets 140 (e.g., traffic/messages) may be exchanged among the nodes/devices 110 of the computer network 100 over links 115 using predefined network communication protocols such as the Transmission Control Protocol (TCP), User Datagram Protocol (UDP), IPv4/IPv6, Asynchronous Transfer Mode (ATM) protocol, Frame Relay protocol, etc.

Figure 2:
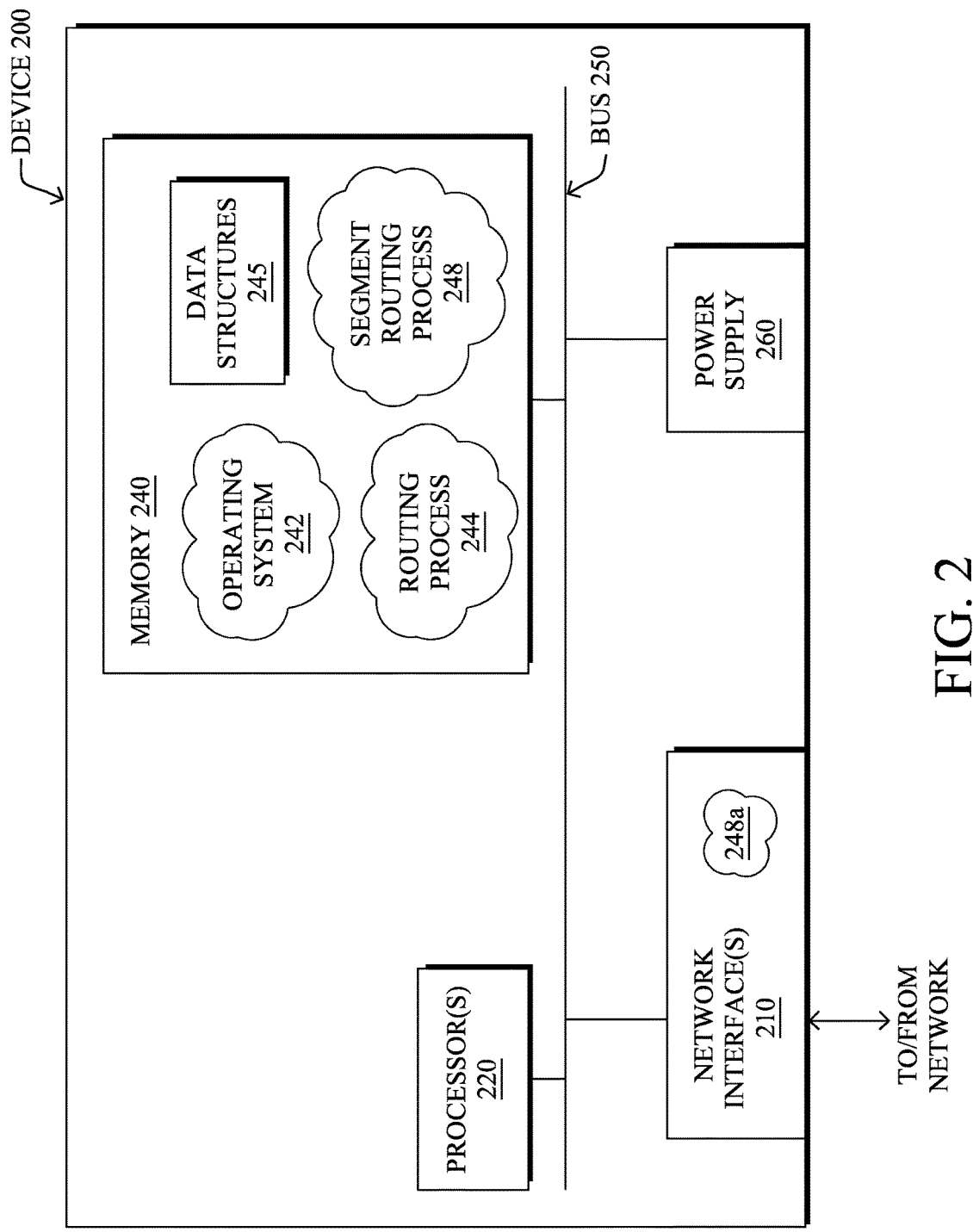
FIG. 2 illustrates an example network device/node.

FIG. 2 is a schematic block diagram of an example device 200 that may be used with one or more embodiments described herein, e.g., such as any of the border routers (PEs), hosts, or the central controller or "EPE" devices as shown in FIG. 1 above. The device may comprise one or more network interfaces 210, one or more processors 220, and a memory 240 interconnected by a system bus 250. The device 200 may also have a power supply 260. The network interface(s) 210 contain the mechanical, electrical, and signaling circuitry for communicating data over links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing process/services 244 and an illustrative segment routing (SR) process 248, as described herein, which may alternatively be located within individual network interfaces (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown and/or described separately, those skilled in the art will appreciate that processes may be routines or modules within other processes.

Routing process/services 244 contain computer executable instructions executed by processor 220 to perform functions provided by one or more routing protocols, such as an Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a routing and/or forwarding information database (RIB/FIB) containing, e.g., data used to make routing/forwarding decisions. In particular, changes in the network topology may be communicated among devices 200 using routing protocols, such as through internal BGP (iBGP) or external BGP (eBGP) sessions (e.g., to "converge" to an identical view of the network topology).

Notably, routing services 244 may also perform functions related to virtual routing protocols, such as maintaining virtual routing and forwarding (VRF) instances, or tunneling protocols, such as for Multi-Protocol Label Switching (MPLS), generalized MPLS (GMPLS), etc., each as will be understood by those skilled in the art. For example, according to the Internet Engineering Task Force (IETF) Request for Comments (RFC) 3107, entitled "Carrying Label Information in BGP-4", label mapping information for a particular route may be piggybacked in the same BGP Update message that is used to distribute the route itself (e.g., in addition to Network Layer Reachability Information (NLRI) within the Update message). In this manner, when BGP is used to distribute a particular route, it can be also be used to distribute a MPLS label which is mapped to that route.

Additionally, BGP in particular may also be used to redistribute an IGP link-state database (LSDB) to per-domain BGP "speakers", in accordance with a technology referred to as BGP Link-State (BGP-LS). That is, certain BGP speakers express their BGP-LS support in capabilities, and then the LSDB may be carried in BGP Messages using NLRIs (e.g., as reachable or unreachable links, nodes, or prefixes (IPv4/IPv6)) and associated Link-State Attributes.

Segment Routing (SR) is an evolving routing architecture that leverages source routing, where the "source" of a packet dictates the path that the packet will follow through the network. In SR, in particular, a group of inter-connected nodes that use SR forms an SR domain, and the ingress node of the SR domain (or host within an SR domain) prepends an SR header containing "segments" to an incoming packet, which represent a controlled list/set of instructions. For instance, each segment represents a topological instruction (e.g., "go to prefix L/8 following a particular path") or a service instruction (e.g., "pass through deep packet inspection"), and may have a local semantic to an SR node or be global within an SR domain. By inserting the desired sequence of instructions, the ingress node is able to steer a packet (enforce a flow) via any topological path and/or service chain, while maintaining per-flow state only at the ingress node (or host) of the SR domain. Each segment in SR is identified by a Segment Identifier (SID). Segments can either be used in isolation (one single segment defines the source route of the packet) or in combination (these segments are part of an ordered list of segments that define the source route of the packet).

By using MPLS labels as SIDs, the SR architecture can be implemented using the existing MPLS dataplane, with no change on the forwarding plane, and only minor extensions to the existing link-state routing protocols. Said differently, a segment may be encoded as an MPLS label, such that an ordered list of segments may be encoded as a stack of labels. In this model, the active segment to process (the segment that must be used by the receiving router to process the packet) is on the top of the stack, and upon completion of a segment, the related label is popped from the stack, and a "next" segment (if any) becomes active. The addition of a segment may be performed with a push. Generally, in the Segment Routing MPLS instantiation, a segment could be an IGP segment, a BGP Peering segment, a Label Distribution Protocol (LDP) label-switched path (LSP) segment, a Resource reSerVation Protocol-Traffic Engineering (RSVP-TE) LSP segment, a BGP LSP segment, etc.

Segment Routing can also be applied to the IPv6 architecture, with a new type of routing extension header. For instance, a segment may be encoded as an IPv6 address, and an ordered list of segments may be encoded as an ordered list of IPv6 addresses in the routing extension header. The active segment to process is indicated by a pointer in the routing extension header, and upon completion of a segment, the pointer is incremented. Correspondingly, a segment can be inserted in the list and the pointer is updated accordingly.

Notably, in SR, a global segment implies that the related instruction is supported by all the SR-capable nodes in the domain. In the MPLS architecture, a Global Segment has a globally-unique index. The related local label at a given node N is found by adding the globally-unique index to a label block called a Segment Routing Global Block (SRGB) of node N (each BGP speaker is configured with an SRGB, and the SRGB could be different on different speakers). In the IPv6 architecture, a global segment is a globally-unique IPv6 address (i.e., the SRGB comprises the set of locally relevant IPv6 addresses). Alternatively, a local segment implies that the related instruction is supported only by the node originating it. In the MPLS architecture, this is a local label outside of the SRGB. In the IPv6 architecture, this is a link-local address.

As noted above, when an AS has several paths to a particular destination address or address prefix, the BGP protocol has typically handled multiple AS egress options by using "best path selection" techniques to choose one (or more) particular egress routes. For example, with reference again to the illustrative topology 100 of FIG. 1 above, AS1 may learn several paths to a destination address prefix "L/8". For instance, via AS3 alone, one such path is via egress router P (P-Q) and up to three paths are via egress router C (C-H, C-E's first interface, and C-E's second interface). Another path may also be learned via AS2 through the C-D interface. A solution is required to allow AS1, particularly via a centralized controller, to force an ingress PE or source host to use a specific egress PE (e.g., C instead of P) and a specific egress interface of that egress PE (e.g., the interface to H instead of the ones to D or E) to reach some destination (a given destination BGP prefix, e.g., L/8).

To be an effective solution in today's computer networking infrastructure, the techniques described herein should apply to the Internet use-case where the Internet routes are assumed to be IPv4 unlabeled or IPv6 unlabeled, and should be applicable to MPLS as well as Internet Protocols (IP). Also, an effective solution should not change the existing iBGP distribution mechanism in place nor make any assumption on the existing iBGP distribution system (route reflectors (RRs), confederations, or iBGP full meshes), and it should minimize the need for new BGP capabilities at the ingress PEs. Moreover, an effective solution should also not require placing the internet routes in a VRF, and should allocate labels on a per-route, per-path basis for scalability reasons. Furthermore, an effective solution should allow egress PEs to set next-hop-self on eBGP-learned Internet routes that they announce to their iBGP peers. Lastly, an effective solution should support automated fast reroute (FRR) and fast convergence.

Responsive to the requirements above, the techniques herein define a Segment Routing (SR)-based Egress Peer Engineering (EPE) solution (SR-EPE) that allows a centralized (e.g., software-defined network, or SDN) controller to program any egress peer policy at ingress border routers or at hosts within the domain/AS. That is, according to the techniques herein, a centralized controller is able to instruct an ingress PE or a content source within the domain to use a specific egress PE, a specific external interface, and/or a specific group of egress PEs/interfaces to reach a particular destination. As described in greater detail below, extensions (e.g., BGP-LS) for exporting BGP egress point topology information (including its peers, interfaces, and peering ASs) are defined in a way that allows for the computation of efficient Egress Point Engineering policies and strategies.

Specifically, as described in greater detail below, the techniques herein introduce an EPE controller ("X" in FIG. 1) running in "ship-in-the-night" with the current iBGP distribution system (i.e., a separate iBGP session that does not interfere with the conventional iBGP session). In particular, the egress PEs (or other classification of border router) of a given SR domain (e.g., AS1) establish an iBGP session type with the EPE controller. Over this session, the egress PE advertises BGP Peering Routes that describe the peering connectivity of the PE (thanks to new TLVs and Extended Community attributes describing peer node, peer interface and peer AS), where a BGP Peering Route includes a BGP Peering SID selected from newly defined categorizations of Peer Node (PeerNode), Peer Adjacency (PeerAdj), and Peer Group (PeerGroup) (or "PeerSet" or "PeerAS"). As described in greater detail below, a PeerNode SID enforces the forwarding via any interface to the related peer, a PeerAdj SID enforces the forwarding via a specific interface to a peer, and a PeerGroup SID enforces the forwarding via any interface to any peer within the related group of peers.

With this information (plus a BGP-based demand matrix), the EPE controller is able to choose when to route/reroute a flow and if so towards which egress PE and which egress peer. The solution describes how the policy can be programmed at a source host (SR-based static route) or at an ingress PE router. The solution described below also includes an automated FRR mechanism for the newly defined Peering SIDs.

Notably, the techniques described herein also include an optional behavior where the Peering Routes are sent to the ingress PEs such as to speedup convergence and high-availability properties. In this optional behavior, the solution documents two sub-modes: one which does not require any new functionality at the ingress PE (for incremental deployment), and another one based on BGP intra-resolution (requires new behavior at the ingress PE, but improves performance by eliminating one lookup recursion in the dataplane FIB).

Illustratively, the techniques described herein may be performed by hardware, software, and/or firmware, such as in accordance with the segment routing (SR) process 248/248a, which may contain computer executable instructions executed by the processor 220 (or independent processor of interfaces 210) to perform functions relating to the techniques described herein. For example, the techniques herein may be treated as extensions and/or alternatives to conventional protocols, such as an extension to BGP (e.g., iBGP), and as such, may be processed by similar components understood in the art that execute those protocols, accordingly.

For purposes of discussion herein, the centralized controller ("X") is referred to as the "EPE Controller", and an egress border router where the EPE traffic-steering functionality is implemented is referred to as an EPE-enabled border router. Also, the input policy programmed at an ingress border router or at a content source/host ("H") is referred to as an EPE policy. Note also that while the examples below are described for IPv4 with MPLS-based segments, an IPv6-native solution is described in a later section.

With more specificity to the network 100 of FIG. 1, assume the following IPv4 addressing:
  C's interface to D: 1.0.1.1/24, D's interface: 1.0.1.2/24;
  C's interface to H: 1.0.2.1/24, H's interface: 1.0.2.2/24;
  C's upper interface (link 1) to E: 1.0.3.1/24, E's interface: 1.0.3.2/24;
  C's lower interface (link 2) to E: 1.0.4.1/24, E's interface: 1.0.4.2/24;
  Loopback of E used for eBGP multi-hop peering to C: 1.0.5.2/32; and
  C's loopback is 3.3.3.3/32 with SID 64.
Also, assume the following BGP peering for C:
  Single-hop eBGP peering with neighbor 1.0.1.2 (D);
  Single-hop eBGP peering with neighbor 1.0.2.2 (H); and
  Multi-hop eBGP peering with E on IP address 1.0.5.2 (E).
C's resolution of the multi-hop eBGP session to E can also be illustrated as follows:
  Static route 1.0.5.2/32 via 1.0.3.2; and
  Static route 1.0.5.2/32 via 1.0.4.2.

An SR-capable BGP node (EPE enabled egress PE, such as node C) may advertise segments corresponding to its attached peers. (Segments are defined by an Egress Peer Engineering (EPE) capable node and corresponding to its attached peers.) These segments are called BGP Peering Segments or BGP Peering SIDs. They enable the expression of source-routed inter-domain paths.

An ingress border router of an AS1 may compose a list of segments to steer a flow along a selected path within the AS, towards a selected egress border router C of AS1 and through a specific peer. At minimum, as described herein, a BGP Peering Engineering policy applied at an ingress PE involves two segments: the Node SID of the chosen egress PE and then the BGP Peering Segment for the chosen peer or peering interface. As mentioned above, the following three types of BGP Peering Segments/SIDs are defined for use herein: PeerNode Segment/SID, PeerAdj Segment/SID, and PeerGroup Segment/SID.

A BGP PeerNode segment/SID is a local segment. At the BGP node advertising it, its semantics is:
  SR header operation: NEXT; and
  Next-Hop (or "Nhop"): the address of the connected peering node to which the segment is related.
The PeerNode may be advertised with a Peering Segment NLRI, where:
  (Local) Node Descriptor is the IGP node describing the EPE enabled egress PE;
  Peer Descriptor is the ASN (AS number/ID) of the peer;
  Link Descriptors contain the addresses used by the BGP session (e.g., an IPv4 Interface Address to contain the BGP session IPv4 local address, an IPv4 Neighbor Address to contain the BGP session IPv4 peer address, an IPv6 Interface Address to contain the BGP session IPv6 local address, or an IPv6 Neighbor Address to contain the BGP session IPv6 peer address); and
  Peer Attribute contains the Adjacent SID (Adj-SID).
In addition, various BGP-LS Link Attributes may be inserted in order to advertise the characteristics of the link.

A BGP PeerAdj segment/SID is a local segment. At the BGP node advertising it, its semantics is:
  SR header operation: NEXT; and
  Next-Hop: the address of the peer connected through the interface to which the segment is related.
The PeerAdj is advertised with a Peering Segment NLRI, where the fields are similar to the PeerNode Peering Segment NLRI above, but where the Peer Descriptor is the IP address and ASN of the peer.

Lastly, a BGP PeerGroup (or "PeerSet" or "PeerAS") segment/SID is a local segment. At the BGP node advertising it, its semantics is:
  SR header operation: NEXT; and
  Next-Hop: load-balance (e.g., equal cost multi-path or "ECMP") across any connected interface to any peer in the related group/set/AS. Note that a group could be all the connected peers from the same AS or a subset of these. A group could also span across ASes. The group definition is a policy set by the operator.
The PeerGroup SID is advertised in a Peering Segment NLRI (a Peer Type NLRI) (PeerNode or PeerAdj) as a BGP-LS attribute. The PeerGroup Attribute contains an Adj-SID identifying the Group/Set/AS to which the PeerNode or PeerAdj belongs.

As an illustration, and as a result of its local configuration based on the newly defined BGP Peering Segments above, node C may allocate the following BGP Peering Segments in accordance with the techniques herein:
  A PeerNode segment is allocated to each peer (D, H and E);
  A PeerAdj segment is defined for each recursing interface to a multi-hop peer (C-E upper and lower interfaces); and
  A PeerGroup is defined to include all peers in AS3 (peers H and E).
Specifically, using IPv4 addressing and MPLS-based segments as an illustration, these Peering Segments may be configured at least as follows:

PeerNode for Node D:
  Node Descriptors (router-ID, ASN): 3.3.3.3, AS1;
  Peer Descriptors (peer ASN): AS2;
  Link Descriptors (IPv4 interface address, neighbor IPv4 address): 1.0.1.1, 1.0.1.2;
  Adj-SID Attribute: 9001; and
  Various Link Attributes.
PeerNode for Node H:
  Node Descriptors (router-ID, ASN): 3.3.3.3, AS1;
  Peer Descriptors (peer ASN): AS3;
  Link Descriptors (IPv4 interface address, neighbor IPv4 address): 1.0.2.1, 1.0.2.2;
  Adj-SID Attribute: 9003;
  PeerGroup-SID Attribute: 9008; and
  Various Link Attributes.
PeerNode for Node E:
  Node Descriptors (router-ID, ASN): 3.3.3.3, AS1;
  Peer Descriptors (peer ASN): AS3;
  Link Descriptors (IPv4 interface address, neighbor IPv4 address): 1.0.5.1, 1.0.5.2;
  Adj-SID Attribute: 9005;
  PeerGroup-SID Attribute: 9008; and
  Various Link Attributes.
PeerAdj for Node E, Link 1:
  Node Descriptors (router-ID, ASN): 3.3.3.3, AS1;
  Peer Descriptors (peer ASN): AS3;
  Link Descriptors (IPv4 interface address, neighbor IPv4 address): 1.0.3.1, 1.0.3.2;
  Adj-SID Attribute: 9006; and
  Various Link Attributes.
PeerAdj for Node E, Link 2:
  Node Descriptors (router-ID, ASN): 3.3.3.3, AS1;
  Peer Descriptors (peer ASN): AS3;
  Link Descriptors (IPv4 interface address, neighbor IPv4 address): 1.0.4.1, 1.0.4.2;
  Adj-SID Attribute: 9007; and
  Various Link Attributes.

Note that in one embodiment, other more complete configurations are possible, such as including redundant interface information (nodes with a single interface) and/or including PeerGroups for nodes/interfaces belonging to groups alone, etc. For completeness of the illustration, the following Peering Segments may also be configured:

PeerAdj for Node D, only link:
  Node Descriptors (router-ID, ASN): 3.3.3.3, AS1;
  Peer Descriptors (peer ASN): AS2;
  Link Descriptors (IPv4 interface address, neighbor IPv4 address): 1.0.1.1, 1.0.1.2;
  Adj-SID Attribute: 9002; and
  Various Link Attributes.
PeerAdj for Node H, only link:
  Node Descriptors (router-ID, ASN): 3.3.3.3, AS1;
  Peer Descriptors (peer ASN): AS3;
  Link Descriptors (IPv4 interface address, neighbor IPv4 address): 1.0.2.1, 1.0.2.2;
  Adj-SID Attribute: 9004; and
  PeerGroup-SID Attribute: 9008; and
  Various Link Attributes.

Furthermore, in this more complete model, the PeerAdj for Node E, Links 1 and 2 may further include the PeerGroup-SID Attribute for AS3 (9008), and the PeerNode for Node D may include its own PeerGroup-SID Attribute for AS2, say 9009.

Device C may then program its forwarding table (e.g., an SRGB) accordingly, as shown in FIG. 3. In particular, the table 300 (e.g., a data structure 245) may have entries 320 as shown that each comprise an incoming label 305, an operation 310, and an outgoing interface 315. (The optional "more complete" model values are shown greyed out.)

Specifically, border router C may bind a local peering segment per peer (9001 for peer D, 9003 for peer H, and 9005 for peer E) and install the related table entries summarized as follows:
  9001: pop and forward on the single link to D;
  9003: pop and forward on the single link to H; and
  9005: pop and ECMP forward across the two links to E.
Note again that 9001, 9002, and 9003 are called BGP PeerNode segments or PeerNode SIDs, and they are local segments.

Border router C may also bind a local peering segment per connected peering interface and install the related table entries summarized as follows:
  9002 (optional): pop and forward on the single link to D;
  9004 (optional): pop and forward on the single link to H;
  9006: pop and forward on link 1 to E; and
  9007: pop and forward on link 2 to E.
Note here that 9002, 9004, 9006, and 9007 are called BGP PeerAdj segments or PeerAdj SIDs, and they are local segments.

Lastly, border router C may bind a local peering segment per connected AS (9008 for AS3, 9009 for AS2) and install the related SRDB entries:
  9008: pop and ECMP forward across the link to H and the two links to E; and
  9009 (optional): pop and forward on the single link to D.
The 9008 and 9009 values are called BGP PeerGroup segments or PeerGroup SIDs. They are also local segments. Note that 9001, 9002, 9003, 9004, 9005, 9006, 9007, 9008, and 9009 are generically called BGP Peering Segments. (Note also that the labels/SIDs are used merely as examples, and no particular naming convention is implied or otherwise limiting.)

For the distribution of external topology and TE information, the techniques herein may illustratively use BGP-LS. For instance, in ships-in-the-night mode with respect to the pre-existing iBGP design, a BGP-LS session may be established between the EPE-enabled border router (C) and the EPE controller (X), and as such, C signals the related BGP-LS NLRIs to the EPE controller X.

Figure 4:
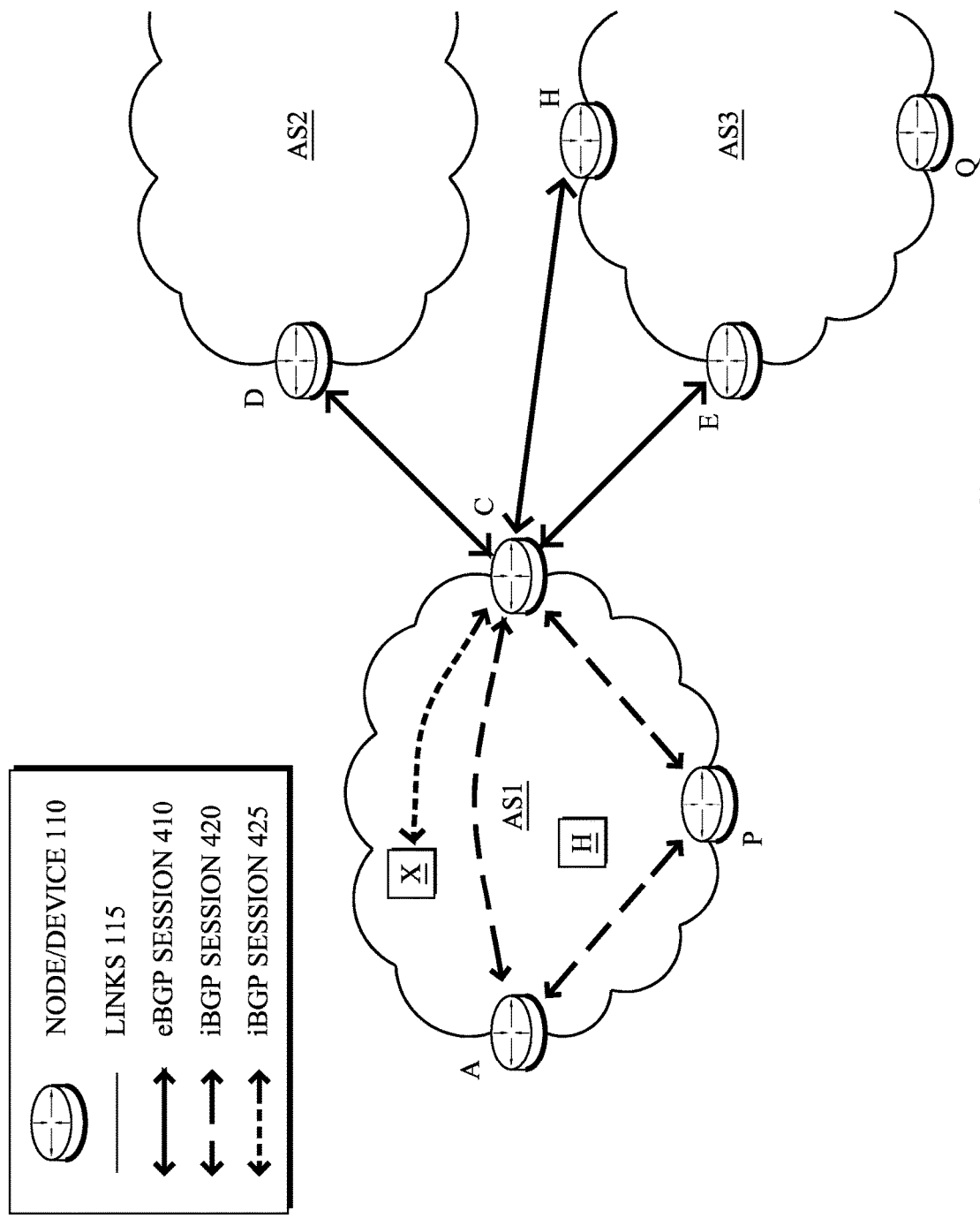
FIG. 4 illustrates an example of BGP sessions in the network.

An example illustration of the BGP sessions involved in the techniques herein (from the perspective of PE C) is shown in FIG. 4. In particular, a conventional eBGP session 410 may be maintained externally by device C with peer AS border routers D, H, and E. Also, a conventional iBGP session 420 may be maintained internally with AS border routers of AS1, that is, between devices C, A, and P. (Note that a BGP Route Reflector or "RR" may also be involved in the iBGP session.) According to the techniques herein, a second, "ship-in-the-night" iBGP session 425 may also be established between any necessary egress PE (e.g., egress PE C only in the example) and the EPE controller X.

The Egress-Peer-Engineering (EPE) controller, based on newly defined BGP functionality shared with egress PEs where peering engineering should occur, allows the EPE controller to be responsible for various functions in accordance with the techniques herein. In particular, the EPE controller may be configured to:
  learn all the BGP paths (BGP-LS routes) from all the peers;
  learn the BGP demand/traffic matrix;
  determine which flow (from which ingress PE to which destination) to route/reroute to which egress peering link; and
  program the ingress PE/host.

In particular, using the collected BGP-LS routes described above (e.g., from BGP-LS advertisements), the EPE controller is able to maintain an accurate description of the egress topology of the egress PEs, such as node C. In addition, the EPE controller is able to associate BGP Peering SIDs to the various components of the external topology according to the techniques herein. Furthermore, the EPE controller may also collect service level agreement (SLA) characteristics across peers (such as for uni-directional SLA monitoring or application control at the source and receiver), as well as collecting the traffic matrix to peers or the final destinations (e.g., through various metric collecting applications or else through collecting the link utilization statistics of each of the internal and external links). The EPE controller may also collect business policies or other decision-affecting policies for its path selection algorithms.

Notably, the EPE controller in one embodiment does not replace/modify the existing iBGP distribution mechanism (session 420). Instead, the EPE controller may run a separate session 425 in "ship-in-the-night" with the existing iBGP distribution mechanism. Note also that while the techniques herein introduce the terminology of BGP Policy Route and BGP Peering Route, no new BGP AFI/SAFI attributes need be defined. In particular, the BGP Policy Route may be an IPv4/unlabeled route and the BGP Peering Route may be a "BGP 3107" route (i.e., according to RFC 3107 or similar protocol that carries label information in BGP messages), such as to distribute MPLS labels. To the contrary, the techniques herein only introduce a new "Steering" attribute to be appended on the BGP peering routes. Furthermore, the enhanced BGP capability defined herein is only required at the EPE controller and at the chosen egress PEs where explicit egress peer engineering should happen. For instance, if device A is a basic ingress PE without any attached peer, then A does not require this enhanced BGP capability.

As noted above, the BGP Peering SIDs previously defined may be distributed using BGP Peering Routes, where a BGP Peering Route is recognized by the presence of a Steering Attribute (e.g., an "Explicit Peer Steering" or "EPS" Attribute indicating that the related route describes a peer), or else via explicit communication. As an example, within an illustrative Explicit Peer Steering (EPS) TLV (type-length-value field), various flags may be used to indicate the types of interfaces and peers. For instance, an "S" flag may indicate that the NLRI is the IP address of a single-hop peer, and a BGP3107 label attached to the NLRI is the PeerNode SID for that peer (in this case, the related PeerAdj SID may be equal to the PeerNode SID). An "M" flag may indicate that the NLRI is the IP address of a multi-hop peer, and the BGP3107 label attached to the NLRI is the PeerNode SID. Further, if an "I" flag is set, then the route describes a connected interface to a multi-hop peer, where the BGP3107 label attached to the NLRI is the PeerAdj SID. Note that when the S flag is set, a multi-hop-peer subTLV may (e.g., must) be present, containing the peer address of the related multi-hop-peer, and this address should (e.g., must) match the NLRI of a route announced with an EPS TLV having the M flag set. Generally, only one of the S, M, and I flags can be set within a single message, and at least one must be set. If the S flag is set, then the Peer-Group subTLV is included. Each such subTLV lists a PeerGroup to which the peer is a member of. In addition, if an "N" flag is set, then the route should not be installed in RIB/FIB. That is, it should only be kept in the BGP database so as to allow for Intra-BGP-Resolution. (Note that for inter-domain steering, the presence of an Inter Domain Steering TLV indicates that the related route describes an IGP prefix which has a related Prefix SID in its domain of origin, and the related SID in the domain of origin is included in the IDS attribute.)

According to the techniques herein, and as mentioned above, the relevant information is shared from egress PEs to the EPE Controller. In particular, a key element of the solution herein is that the BGP peering routes (and their related BGP Peering SIDs) do not need to be sent the ingress PEs, as the base solution only requires the BGP Peering routes to be sent to the EPE Controller. (Variations where the BGP Peering routes are also sent to the ingress PEs are possible, one of which being contemplated below.) It is worth reminding that the techniques herein do not assume any change to the BGP best-path process at the egress PE, and no change to its pre-existing iBGP distribution mechanism or policy. That is, as mentioned previously, the techniques herein add one iBGP session from the egress PE to the EPE controller, where the EPE controller will work in ship-in-the-night mode with the existing iBGP distribution.

An egress border router which wants to allow the engineering of traffic through its connected peers establishes an iBGP session with the EPE controller, and sends two types of routes over that session to the EPE controller:

The BGP Peering routes which describe the peers and their BGP Peering SIDs; and

All the internet routes received from the peers, importantly with their next-hop unchanged.

Regarding BGP Peering routes, for each eBGP peer, a BGP3107 route is advertised, where the NLRI is the /32 address of the eBGP peer (for IPv4). The label is the local PeerNode SID allocated by the egress PE for the peer. The nature of the peer (single-hop or multi-hop) and more information (described above) are encoded in the EPS attribute. Upon any establishment/modification of the state of an eBGP peer marked with segment-routing-mpls policy, the BGP process sends an update of the related 3107 route on the "EPE typed" session.

Regarding Internet routes with the original next-hop, upon reception of an eBGP Internet route from a peer marked with segment-routing-mpls policy, whether it is selected as best or not, whether the normal policy would involve setting the next-hop to self or not, the egress PE forwards the route to the EPE controller with the original next-hop. The EPE is thus able to learn all the paths as received by all the egress PEs (with their next-hop indicating the peer address).

As a re-illustration of the information demonstrated above, but with the newly described EPS Attribute field, C may advertise the following BGP3107 routes to describe its peers:

NLRI <1.0.1.2/32>, Label <9001>, nhop 3.3.3.3, AS Path {AS2}, EPS-Attribute{S=1, N=1}
(where 9001 is the PeerNode SID associated by C for its single-hop peer 1.0.1.2, i.e., node D);

NLRI <1.0.2.2/32>, Label <9003>, nhop 3.3.3.3, AS Path {AS3}, EPS-Attribute{S=1, N=1, PeerGroup(9008)}
(where 9003 is the PeerNode SID associated by C for its single-hop peer 1.0.2.2, i.e., node H, and where 9008 is the PeerGroup SID associated with AS3);

NLRI <1.0.5.2/32>, Label <9005>, nhop 3.3.3.3, AS Path {AS3}, EPS-Attribute{M=1, N=1, PeerGroup(9008)}
(where 9005 is the PeerNode SID associated by C for its multi-hop peer 1.0.5.2, i.e., node E, and where 9008 is the PeerGroup SID associated with AS3);

NLRI <1.0.3.2/32>, Label <9006>, nhop 3.3.3.3, AS Path {AS3}, EPS-Attribute{I=1, Multi-Hop=1.0.5.2, N=1}

(where 9006 is the PeerAdj SID associated by C for the local interface 1.0.3.2/32, i.e., link 1, towards the multi-hop peer 1.0.5.2, i.e., node E); and NLRI <1.0.4.2/32>, Label <9007>, nhop 3.3.3.3, AS Path {AS3}, EPS-Attribute{I=1, Multi-Hop=1.0.5.2, N=1}
(where 9007 is the PeerAdj SID associated by C for the local interface 1.0.4.2/32, i.e., link 2, towards the multi-hop peer 1.0.5.2, i.e., node E).

Thanks to these BGP peering routes, the EPE controller X is able to learn all the eBGP peers attached to C and their related PeerNode SIDs. X is also able to learn all the connected interfaces to multi-hop peers and their related PeerAdj SIDs. (Recall that these routes are only sent by C to the EPE controller X.)

According to one or more embodiments of the techniques herein, implementing a policy involves either enforcing a BGP egress peering policy at an ingress PE or at a host within the AS. As mentioned above, the EPE Controller first peers with all the egress PEs with important peering links to engineer and receives all the information required to build the desired policy. On top of the BGP Peering routes, the EPE controller also receives all the eBGP paths received by the egress PE to engineer:

NLRI <L/8>, nhop 1.0.1.2, AS Path {AS2, AS4}
(The EPE controller X knows that C receives a path to L/8 via neighbor 1.0.1.2 (node D) of AS2. From the previous BGP3107 NLRI's, C knows that this neighbor is single-hop and its PeerNodeSID =9001 and its PeerAdjSID=9002. Note that in certain embodiments, PeerAdjSID may equal PeerNodeSID, rather than having separate values.)

NLRI <L/8>, nhop 1.0.2.2, AS Path {AS3, AS4}
(X knows that C receives a path to L/8 via neighbor 1.0.2.2 (node H) of AS3. From the previous BGP3107 NLRI's, C knows that this neighbor is single-hop and its PeerNodeSID=9003 and its PeerAdjSID=9004, or else PeerAdjSID=PeerNodeSID.)

NLRI <L/8>, nhop 1.0.5.2, AS Path {AS3, AS4}
(X knows that C has an eBGP path to L/8 via AS3 via neighbor 1.0.5.2 (node E). From the previous BGP3107 NLRI's, C knows that the PeerNode SID of that peer is 9005 and that there are two connected interfaces from the egress PE to that peer of respective PeerAdj SIDs 9006 (link 1) and 9007 (link 2).)

Figure 5:
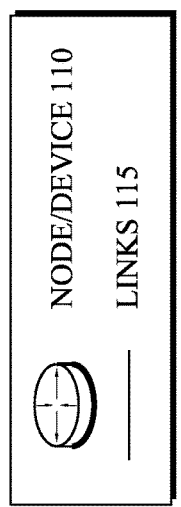
FIG. 5 illustrates an example instruction exchange.
Figure 5:
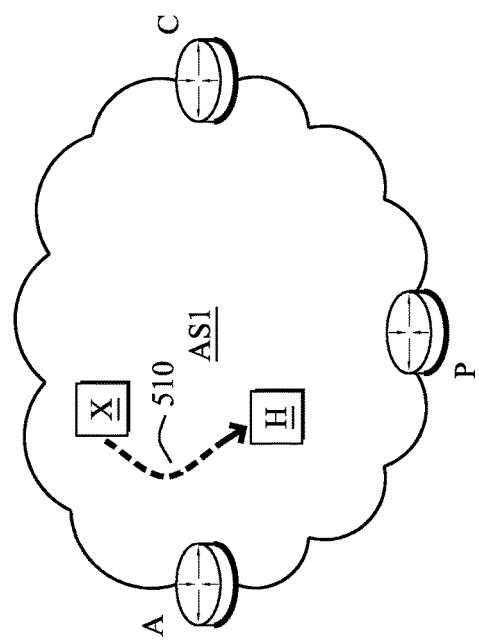

Based on a specified policy and path selection algorithm, the EPE controller X might then decide to force a host H to use a specific path to L/8 via C. This "EPE policy" may be expressed (e.g., in an explicit instruction or other type of suitable message 510 as shown in FIG. 5) as a two-entry segment list where the first element is the IGP prefix SID of the selected egress border router and the second element is a BGP Peering SID at the selected egress border router. A few examples follow, as illustrated in FIGS. 6A-6E:

Policy: *Prefer via AS2* (FIG. 6A)
X programs H with a static SR route to L/8 which pushes the SID list {64, 9001} (i.e., use the interface from C to D).

Policy: *Prefer via AS3, single-hop eBGP peer 1.0.2.2* (FIG. 6B)
X programs H with a static SR route to L/8 which pushes the SID list {64, 9003} (i.e., use the interface from C to H).

Policy: *Prefer via AS3, multi-hop eBGP peer 1.0.5.2* (FIG. 6C)
X programs H with a static SR route to L/8 which pushes the SID list {64, 9005} (i.e., use any interface from C to E).

Policy: *Prefer via AS3, specific interface 1.0.4.2 of multi-hop eBGP peer 1.0.5.2* (FIG. 6D)
X programs H with a static SR route to L/8 which pushes the SID list {64, 9006} (i.e., use link 1 as the interface from C to E).

Policy: *Prefer via any interface to any peer in the group 9008 connected to egress PE C* (FIG. 6E)
X programs H with a static SR route to L/8 which pushes the SID list {64, 9008} (i.e., use any interface from C to AS3).

Figure 6A:
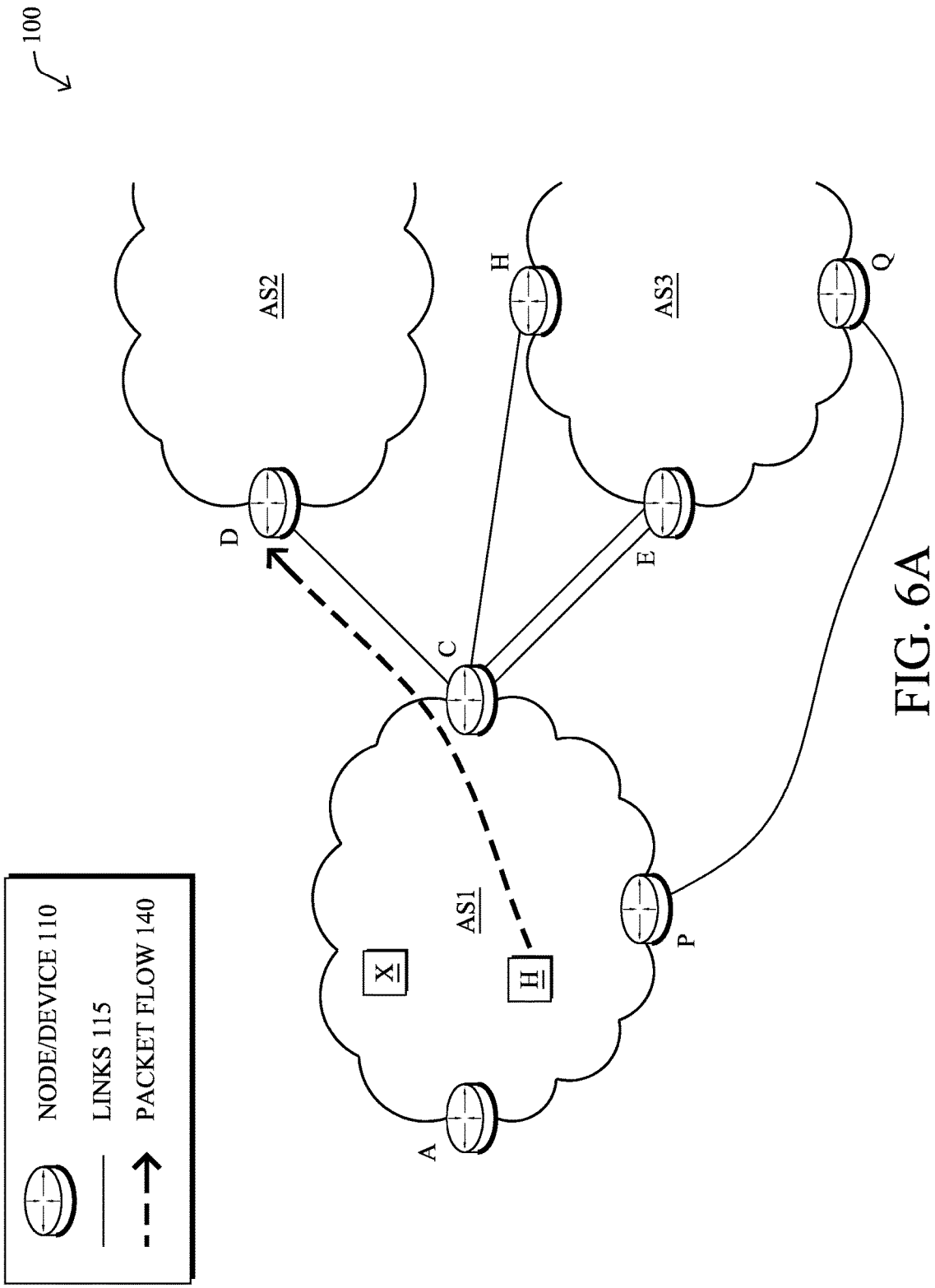
FIGS. 6A-6F illustrate examples of enforced Segment Routing for a host.
Figure 6B:
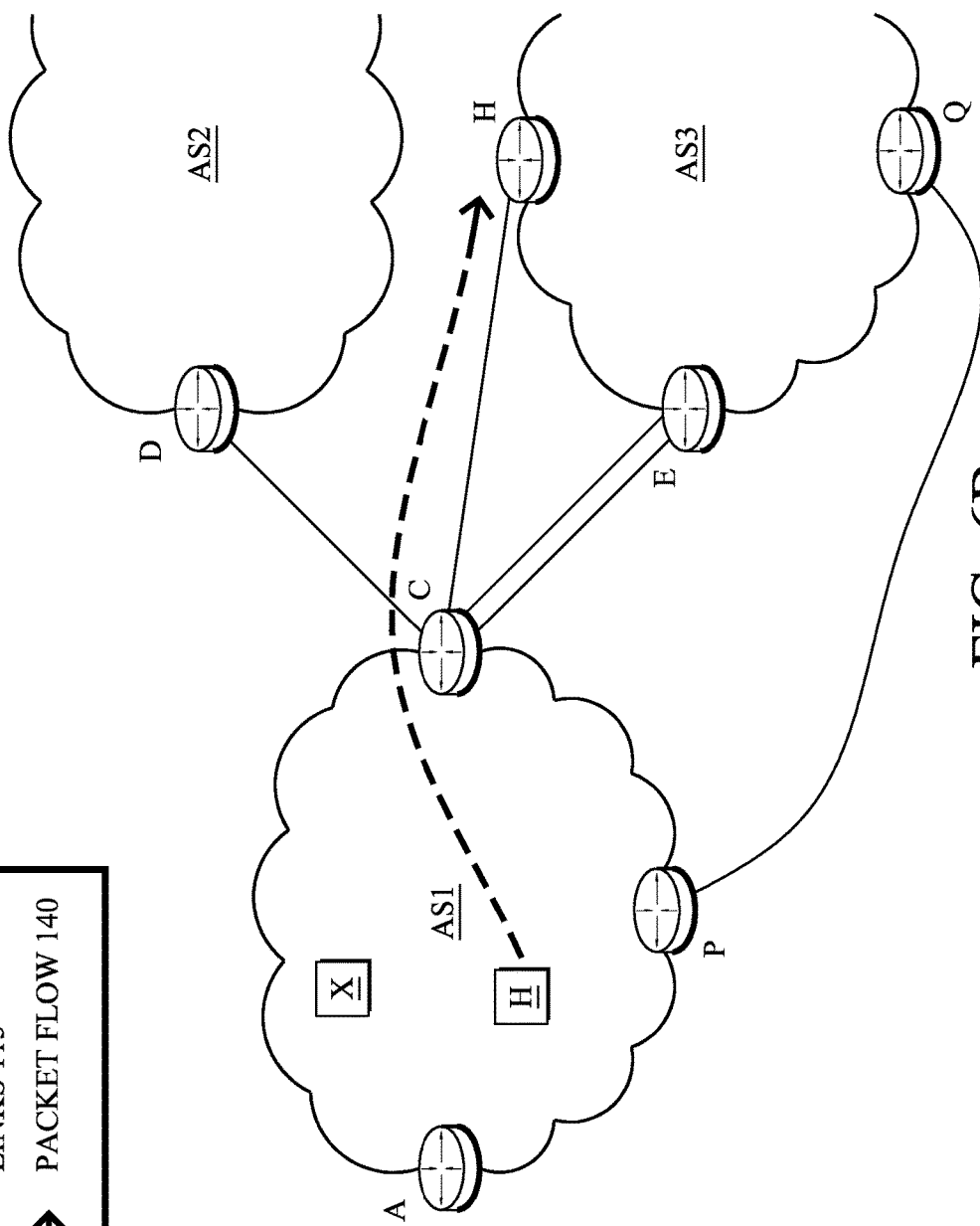
Figure 6C:
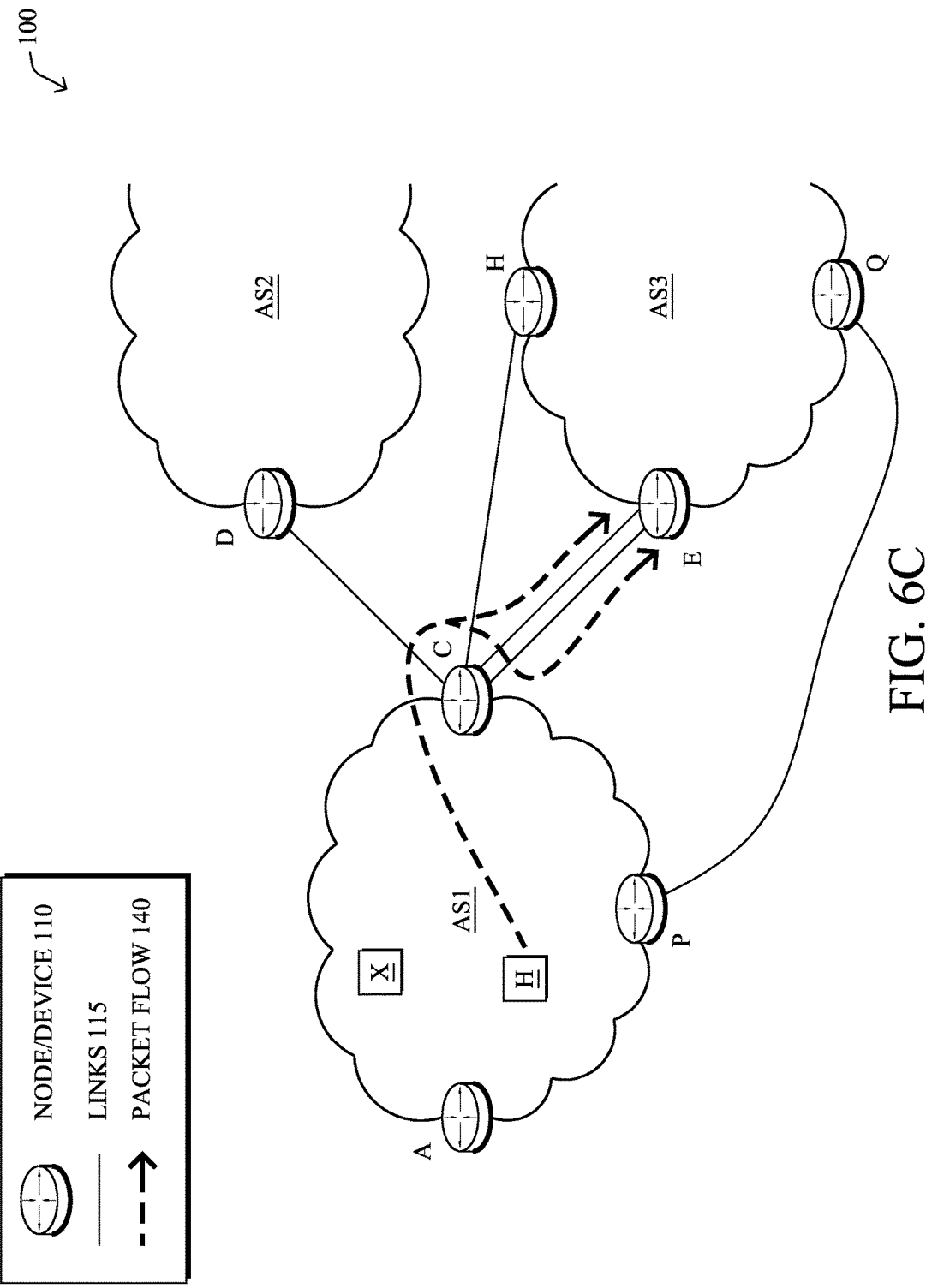
Figure 6D:
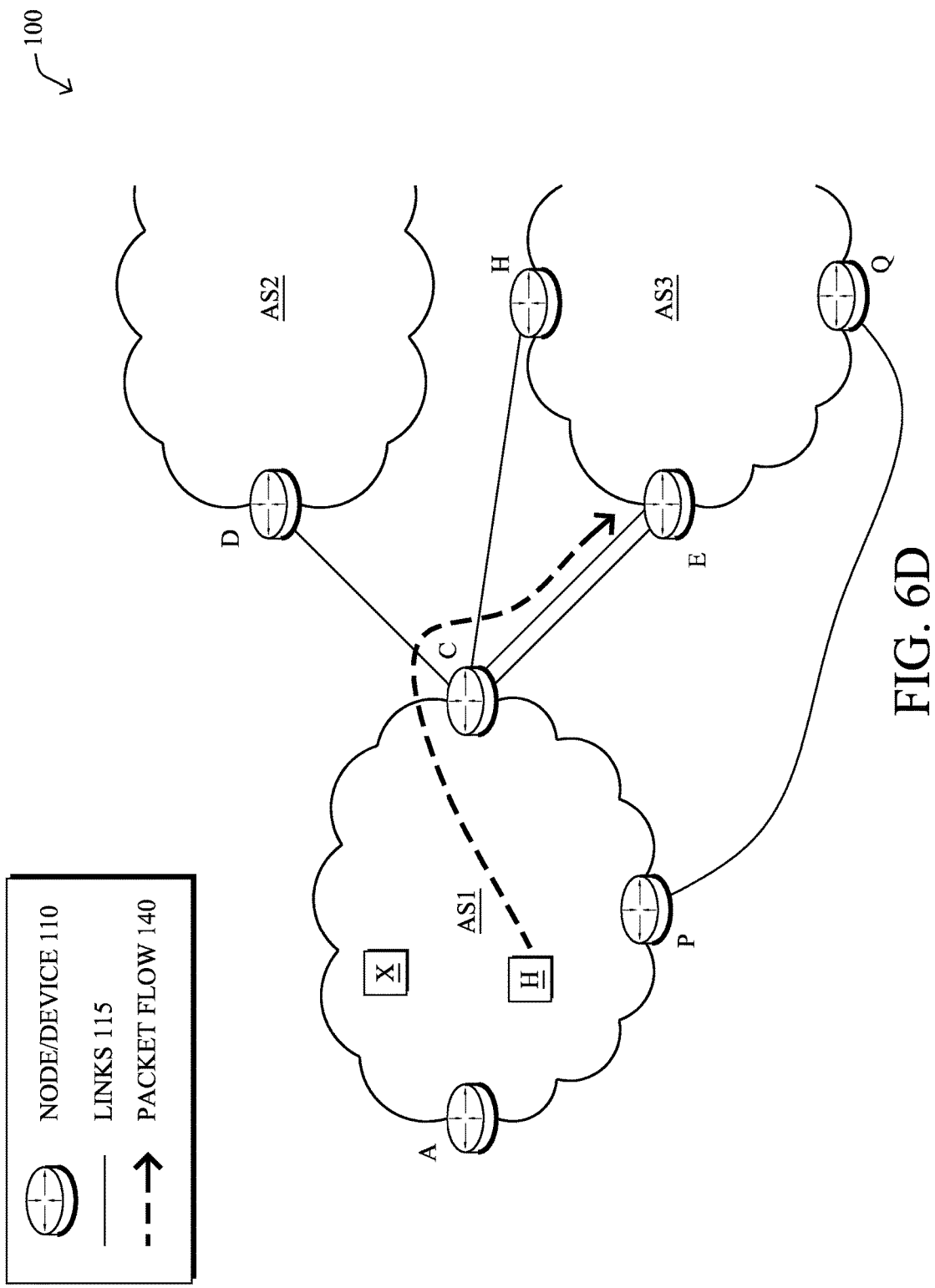
Figure 6E:
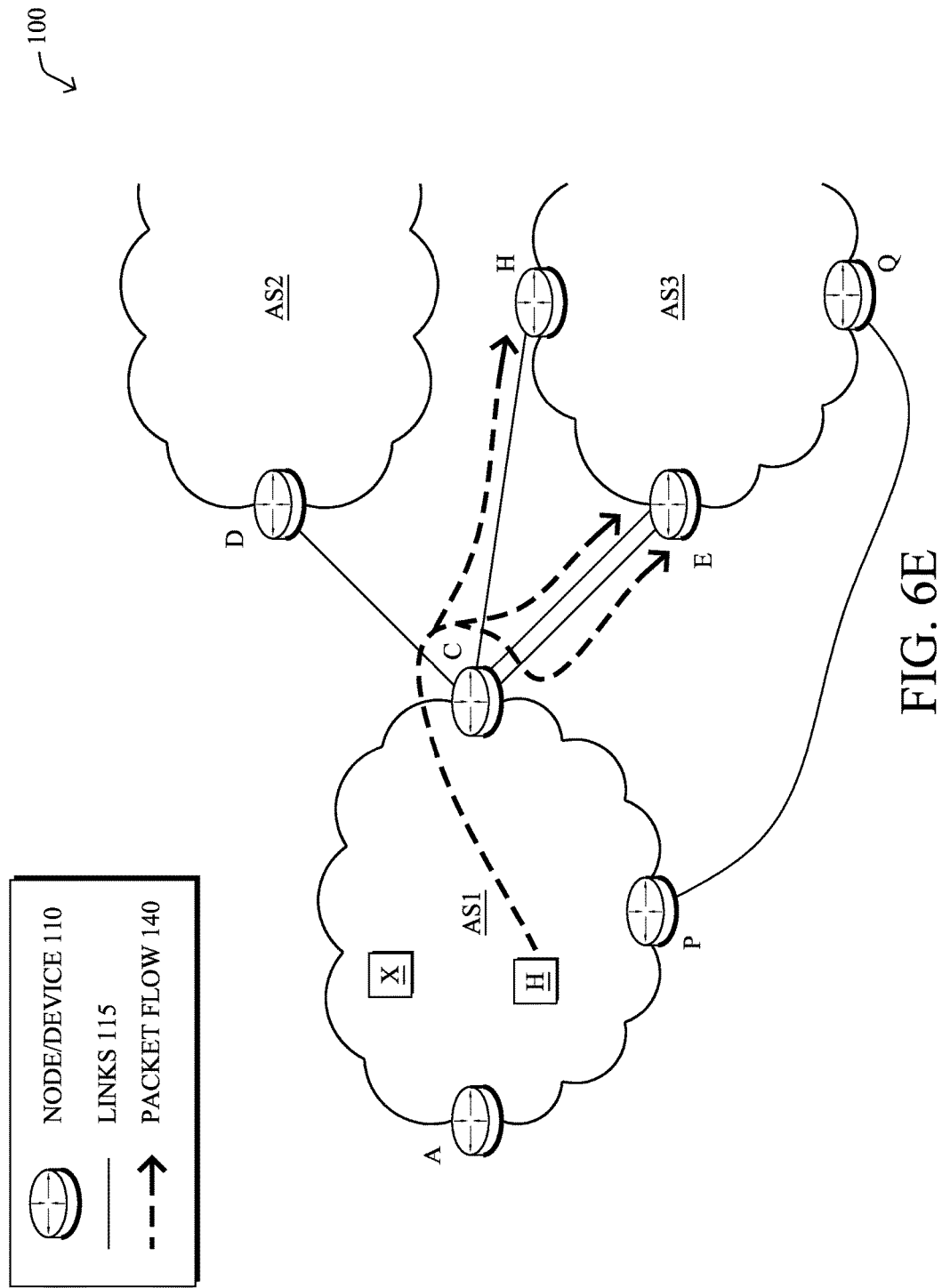
Figure 6F:
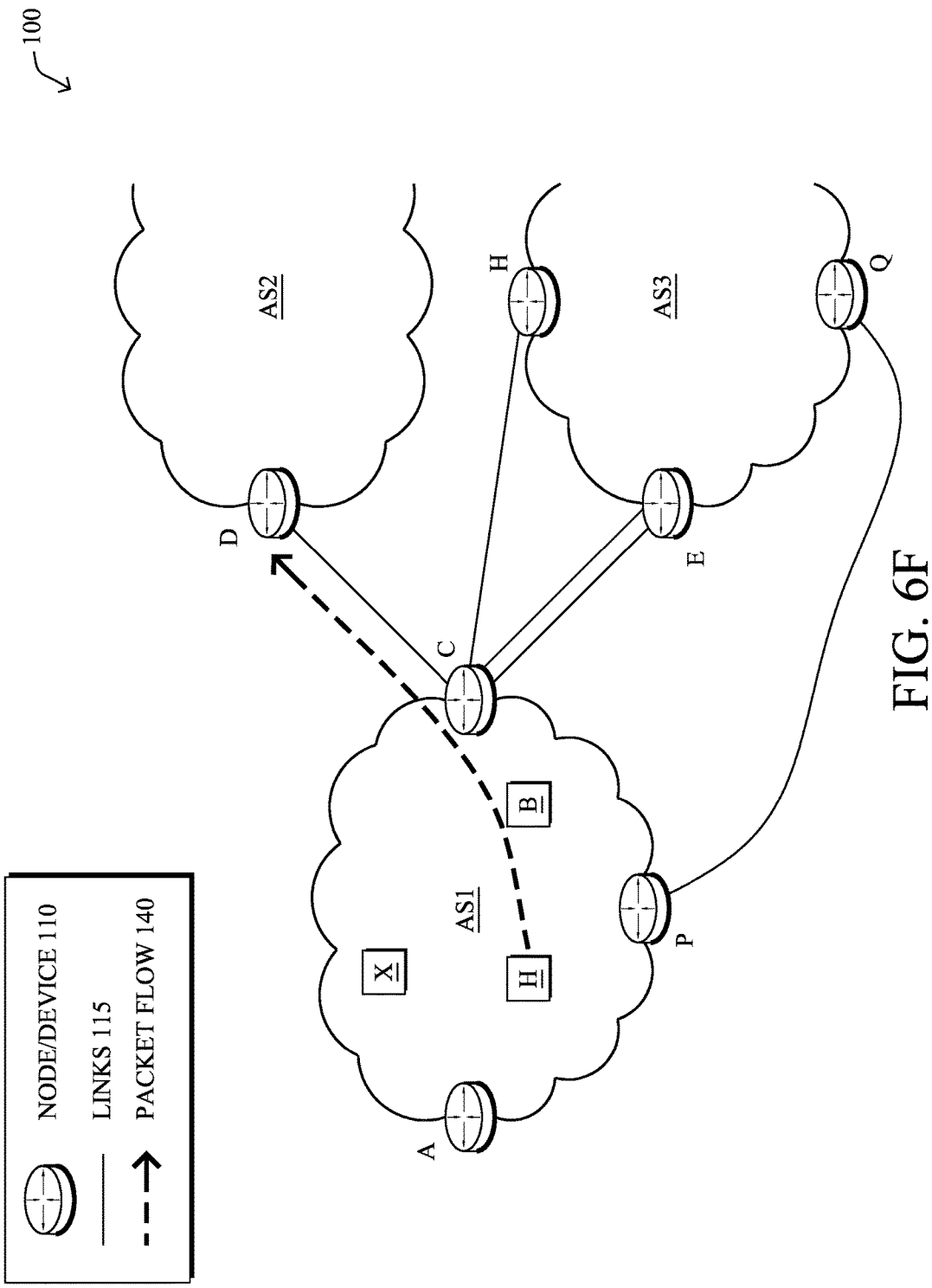

Note that the first SID could be replaced by a list of segments. This is useful when an explicit path within the domain is required for traffic-engineering purposes (e.g., an IGP path). For example, if the Prefix SID of an intermediate node B within AS1 is 60 (as shown in FIG. 6F), and the EPE controller would like to steer the traffic from A to C via this intermediate node and then through the external link to peer D, then the segment list would be {60, 64, 9001}.

Figure 7A:
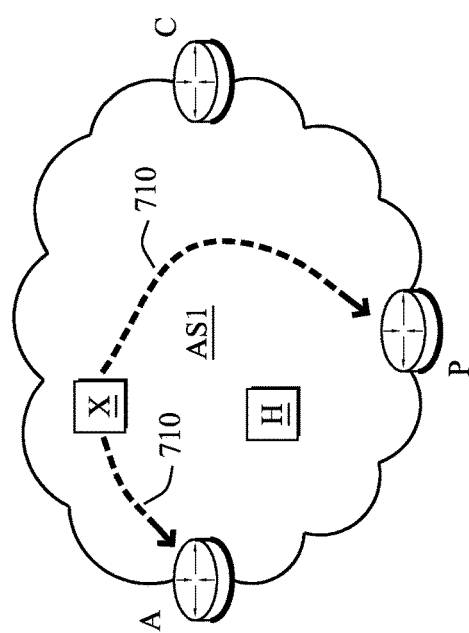
FIGS. 7A-7B illustrate examples of enforced Segment Routing for an ingress PE.
Figure 7A:
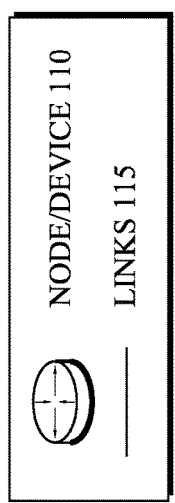

The same process may be used to force an ingress PE router (e.g., P or A) to use a particular SR path. One difference between forcing a host and an ingress router may exist, however, particularly how the programming is executed. While several techniques could be used (e.g., netconf), one viable approach is for the EPE controller to craft a BGP3107 route and send it to the ingress PE with a community/Local Preference which ensures that it will be selected as the best. That is, the chosen egress PE is specified in the nhop field, and the chosen egress peering interface(s) is specified in the label field of the BGP 3107 route (filled with a PeerNode or PeerAdj SID). For example, the policy above for using link 1 of node E could be expressed by sending the following BGP3107 route from the EPE controller X to ingress PE A (e.g., in advertisement 710 of FIG. 7A):

NLRI <L/8>, label <9006>, nhop 3.3.3.3, AS Path {AS3, AS4}, high local-pref.

Figure 7B:
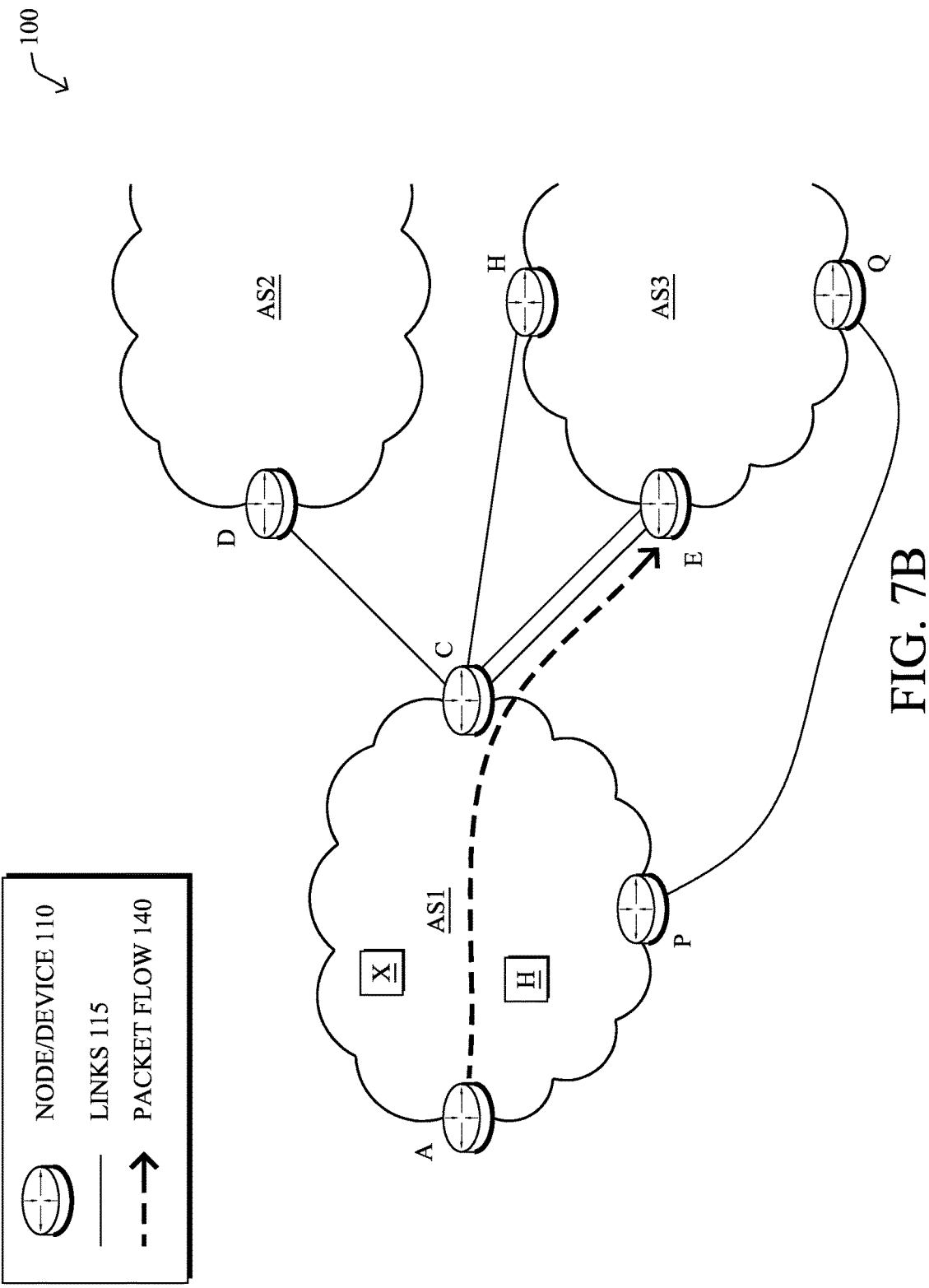
Figure 8A:
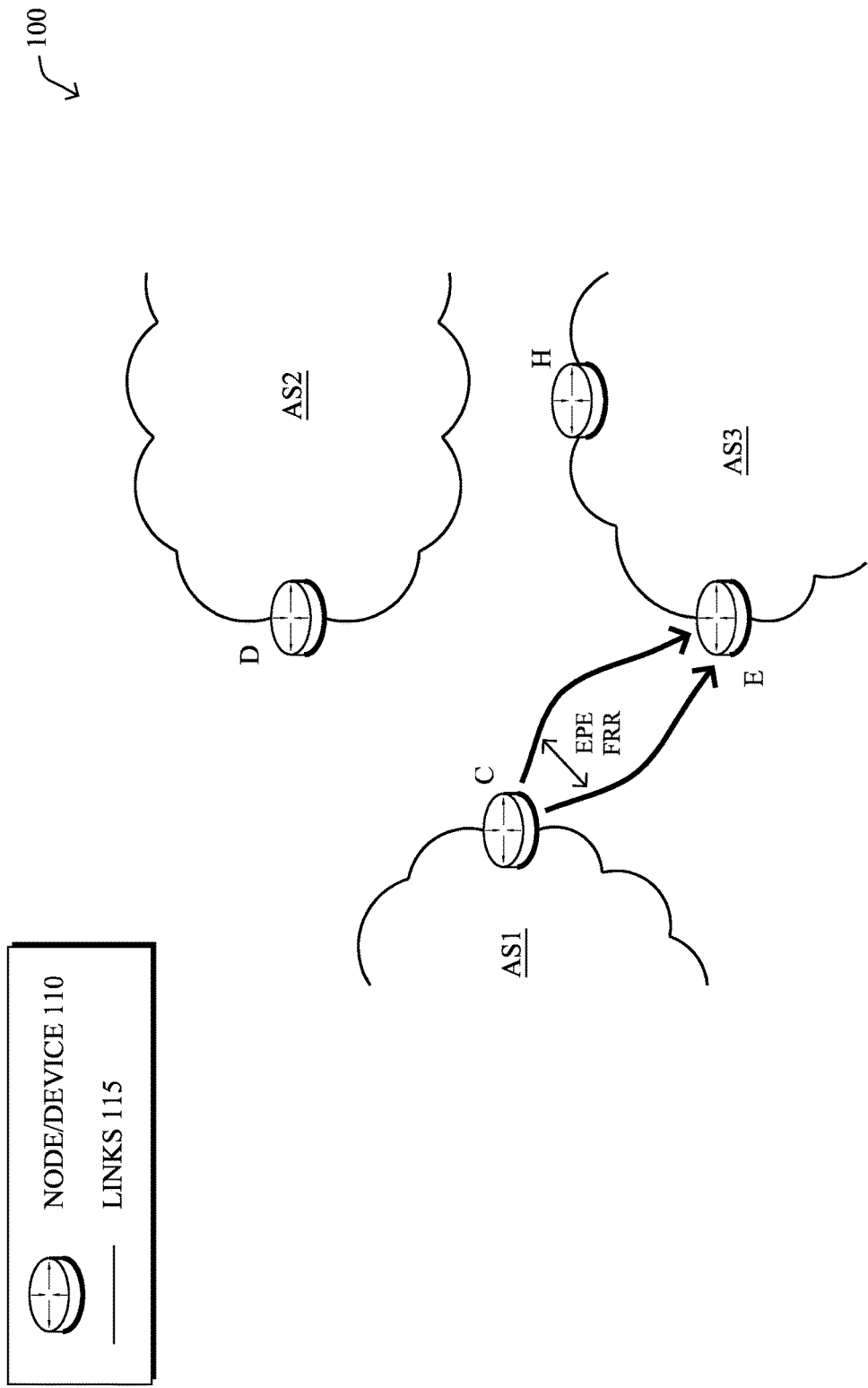
FIGS. 8A-8D illustrate examples of Fast Reroute.
Figure 8B:
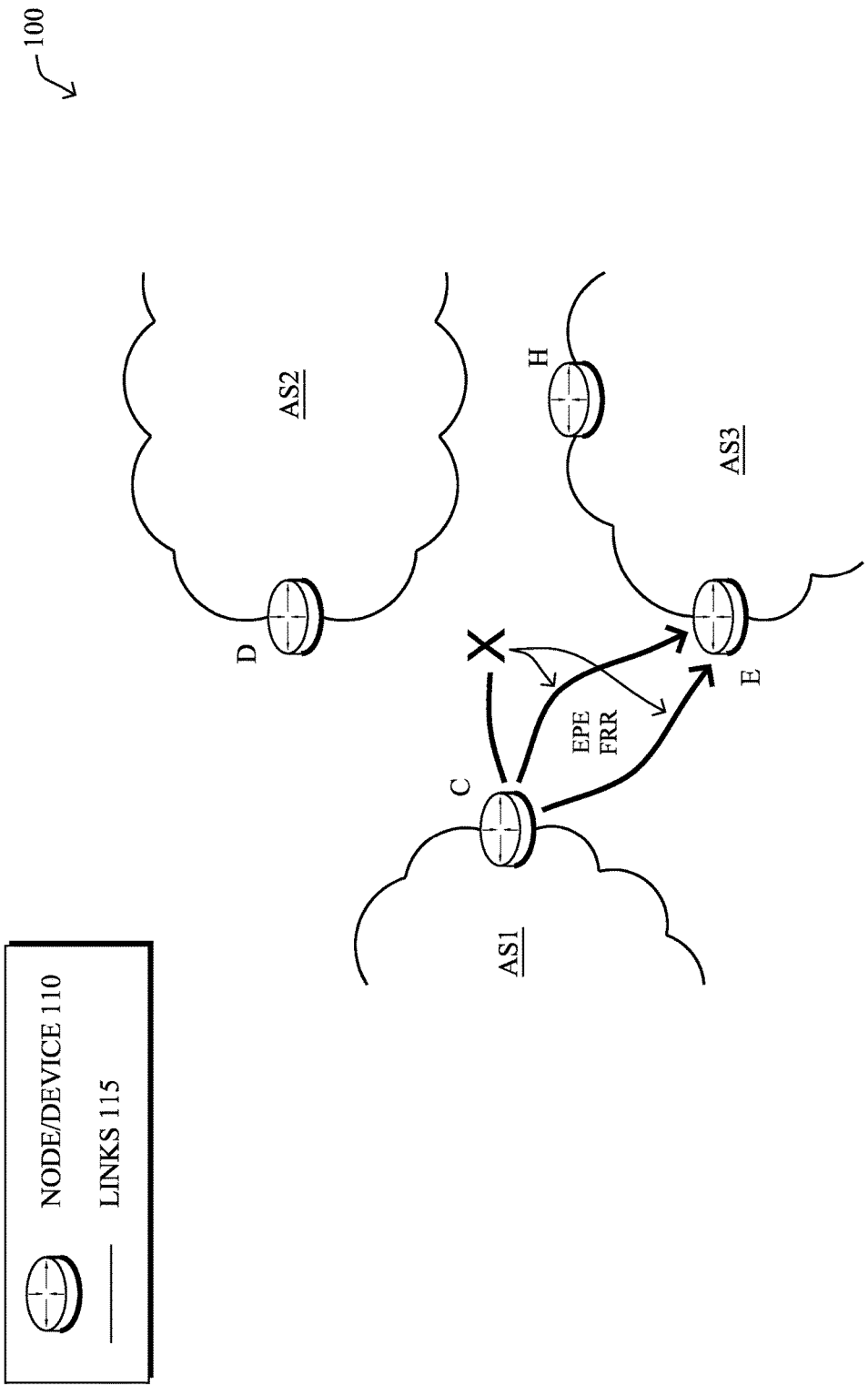
Figure 8C:
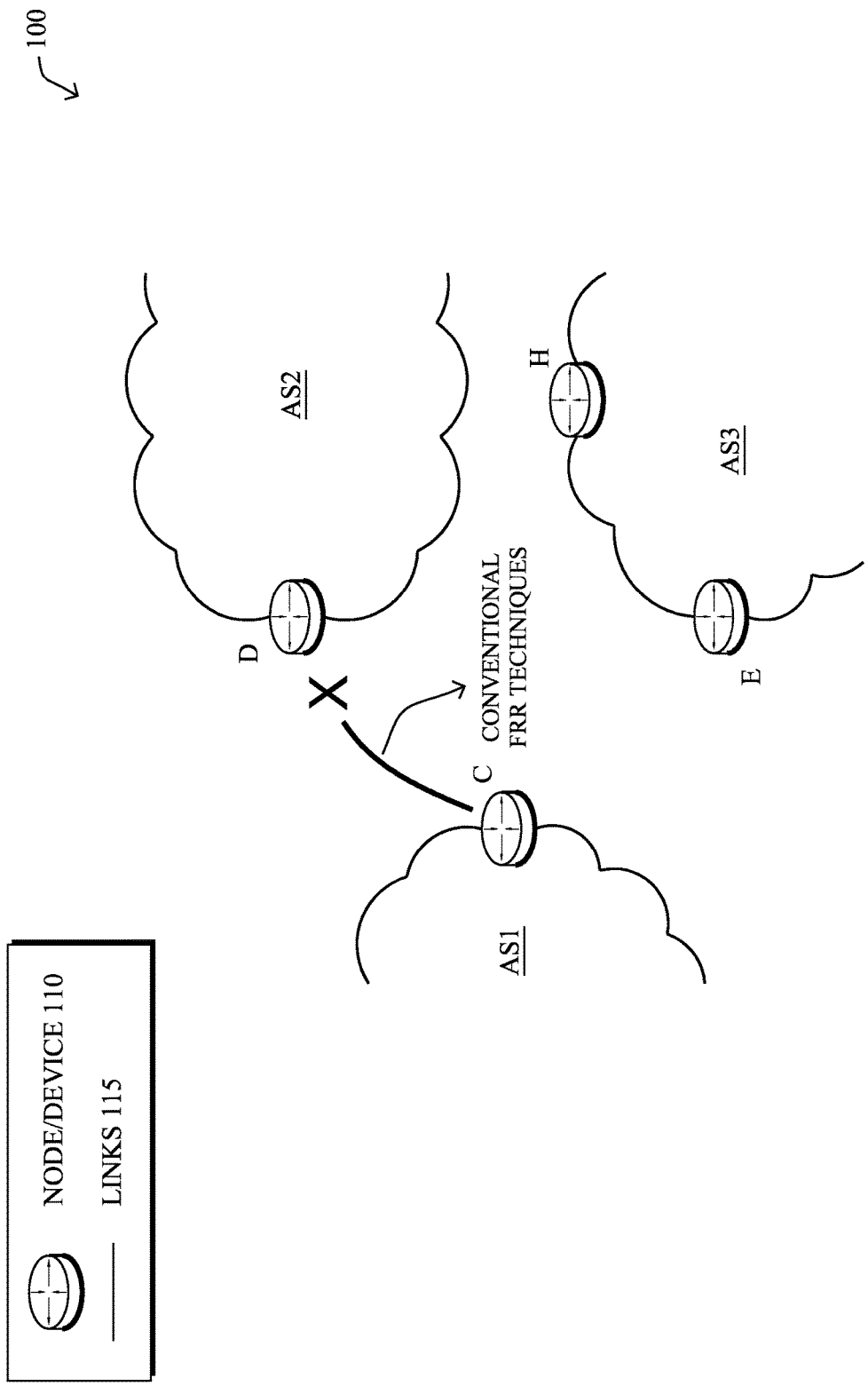
Figure 8D:
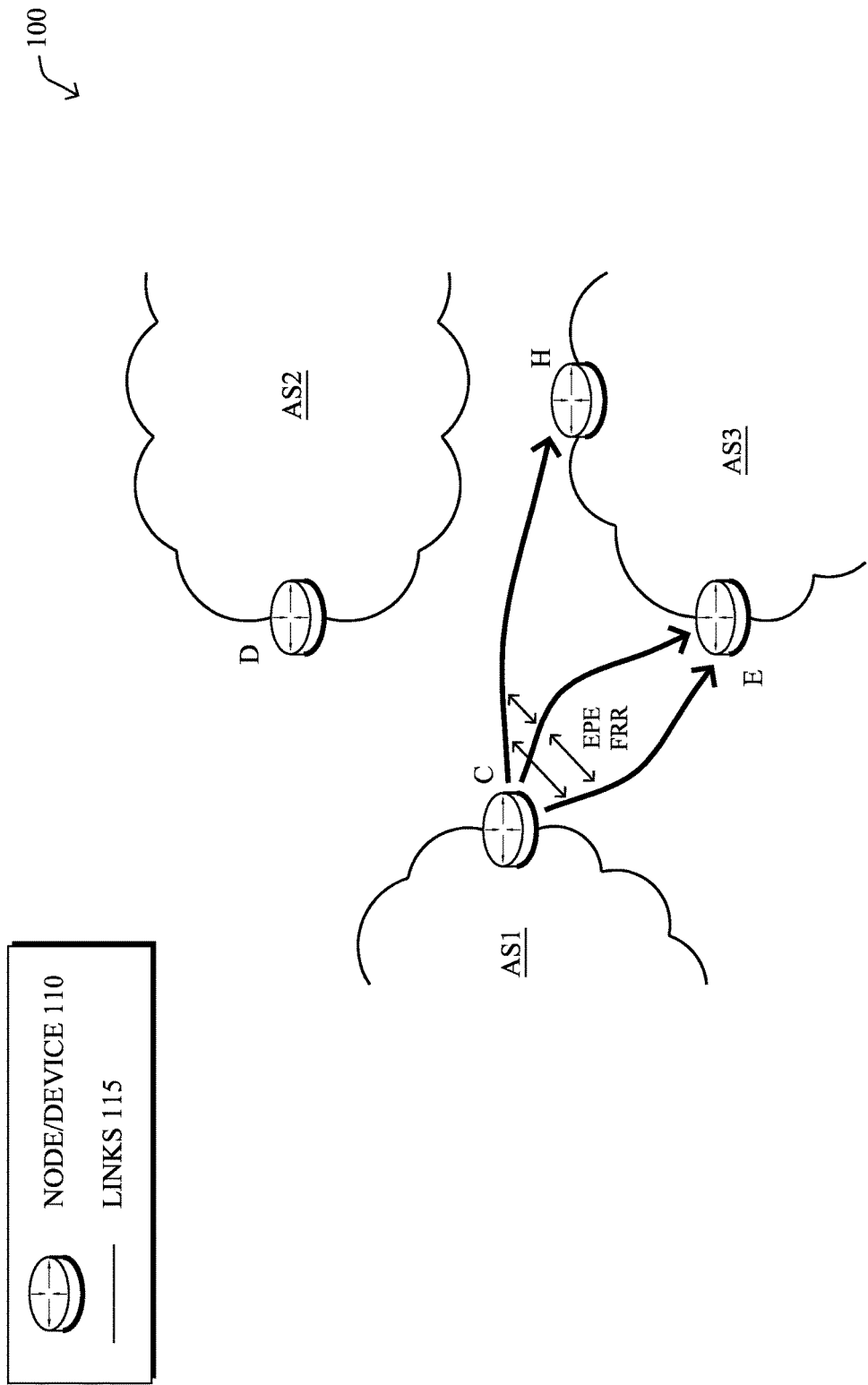

The ingress PE will prefer the path due to the "high local-pref" (high local preference) indicator/value. When installing the route in its FIB, ingress PE A will resolve the nhop 3.3.3.3 on the related IGP route which will cause the related Prefix SID (64) to be pushed on the packet. Ingress PE A will thus forward any L/8-bound packet towards C with label stack {64, 9006}. The label "9006" will then force C to forward the traffic onto the bottom link (link 2) to peer E of AS3. This path is illustrated in FIG. 7B.

According to one or more specific embodiments described herein, Fast Reroute (FRR) considerations may also be configured within the network based on the techniques above. In particular, an EPE-enabled border router may be configured to allocate an FRR backup entry on a per BGP Peering SID basis as follows:

PeerNode SID
1. If multi-hop, backup via the remaining PeerADJ SIDs to the same peer.
2. Else backup via local PeerNode SID to the same AS.
3. Else pop the PeerNode SID and IP lookup (with potential BGP PIC fall-back).

PeerAdj SID
1. If to a multi-hop peer, backup via the remaining PeerADJ SIDs to the same peer.
2. Else backup via PeerNode SID to the same AS.
3. Else pop the PeerNode SID and IP lookup (with potential BGP PIC fall-back).

PeerGroup SID
1. Backup via remaining PeerNode SID in the same PeerGroup.

2. Else pop the PeerGroup SID and IP lookup (with potential BGP PIC fall-back).

Said differently, when an EPE-enabled border router (e.g., node C) allocates a Peering SID, for FRR it must precompute and install the related FRR backup. Some of the different types of possible backups mentioned above are illustrated below using the reference diagrams of FIGS. 8A-8D, and considering the Peering SIDs allocated by C:

PeerNode SID 9005, allocated by C for peer E (FIG. 8A)
  Upon the failure of link 1 from C-E, C can reroute all the traffic onto link 2 to the same peer (E).
  Upon the failure of link 2 from C-E, C can reroute all the traffic onto link 1 to the same peer (E).
  This is true because there are multiple interfaces to the same peer and they can provide backup for each other.
  Note, this FRR scheme is also used for the related PeerAdj SIDs.
PeerNode SID 9003, allocated by C for peer H (FIG. 8B)
  Upon the failure of the connected link C-H, C can reroute all the traffic onto the interfaces to PeerNode SID 9005 (E).
  This is true because peers E and H are in the same peer AS (PeerGroup SID) and hence they can provide backup for each other.
PeerNode SID 90010, allocated by C for peer D (FIG. 8C)
  Upon the failure of the connected link C-D, C can pop the PeerNode SID and lookup the IP destination address in its FIB and route accordingly.
  In this case, there is no second link to the same peer and there is no other peer in the same AS, hence egress PE C must resort to perform an IP Destination address-based lookup to find the solution. Note this allows falling back to the classic BGP PIC Edge FRR mechanism.
PeerGroup SID 9008, allocated by C for the set of peers H and E (FIG. 8D)
  Upon the failure of a connected interface in the group, the traffic is rerouted on any other member of the group.

(Note that for specific business reasons, an operator might not want the default FRR behavior applied to a particular PeerNode SID or any of its depending PeerADJ SID. The operator may thus specifically associate a specific backup arrangement, such as a specific PeerNode SID for another PeerNode SID.)

According to one or more additional specific embodiments described herein, BGP Peering routes may optionally be signaled to the ingress PE, as mentioned above. As a reminder, a key element of the solution is that the BGP peering routes do not generally need to be sent the ingress PEs, and only requires the BGP Peering routes to be sent to the EPE Controller. However, the below-described variation allows the BGP Peering routes to be sent to the EPE controller and the ingress PEs.

In particular, assume that in this embodiment the ingress PEs would thus receive the following routes:
  NLRI <1.0.1.2/32>, Label <9001>, nhop 3.3.3.3, AS Path {AS2}, EPS-Attribute{S=1, N=1};
  NLRI <1.0.2.2/32>, Label <9003>, nhop 3.3.3.3, AS Path {AS3}, EPS-Attribute{S=1, N=1 PeerGroup(9008)};
  NLRI <1.0.5.2/32>, Label <9005>, nhop 3.3.3.3, AS Path {AS3}, EPS-Attribute{M=1, N=1 PeerGroup(9008)};
  NLRI <1.0.3.2/32>, Label <9006>, nhop 3.3.3.3, AS Path {AS3}, EPS-Attribute{I=1, Multi-Hop=1.0.5.2, N=1}; and
  NLRI <1.0.4.2/32>, Label <9007>, nhop 3.3.3.3, AS Path {AS3}, EPS-Attribute{I=1, Multi-Hop=1.0.5.2, N=1}.

To implement an EPE policy, the EPE Controller would send to the ingress PE an IPv4 (or IPv6) non-labelled route (in the base solution, it would be a BGP3107 route) with nhop recursing on the chosen eBGP original next-hop (in the base solution, the nhop would be the loopback of the chosen egress PE):

NLRI <L/8>, nhop 1.0.1.2, AS Path {AS2, AS4}, high local-pref, BIR Ext-Comm
    The "BIR Ext-Comm" is a BGP Intra Resolution (BIR) extended community that indicates that the BGP Intra Resolution feature should be executed on this route.

Basically, the EPE sends a recursive BGP route and lets the ingress PE perform the resolution. The resolution can be performed either as BGP intra-resolution, or else in a backward compatible mode.

For BGP intra-resolution, if the ingress PE is able to decode the EPS-Attribute, then the ingress PE would receive these BGP3107 routes and does not install them in its RIB/FIB (N flag is set). Furthermore, if the ingress PE is able to decode the BIR extended-community, then the ingress PE knows it should apply the BGP intra-resolution to the received route from the EPE controller. Upon receiving the L/8 route, the ingress PE (e.g., A) would look whether it has a BGP Peering Route to resolve the nhop. If so, it would resolve it and install in RIB/FIB the resolved route:
  L/8=>3.3.3.3 and push 9001; and
  3.3.3.3=>oif= . . . and push 64.

Regarding backward compatible mode, if the ingress PE is not able to decode the EPS-Attribute/BIR extended community, then the ingress PE would receive these BGP3107 routes and would install them in RIB/FIB. The ingress PE would also install the L/8 route in RIB/FIB, as "received" from the EPE controller hence with the next-hop set to 1.0.1.2. In this case, the resolution would occur in RIB/FIB:
  L/8=>1.0.1.2;
  1.0.1.2=>3.3.3.3 and push 9001; and
  3.3.3.3=>oif= . . . and push 64.

When BGP Peering routes are optionally signaled to the ingress PE, upon peering link failure (e.g., link 2 of C-E), the egress PE can withdraw the related BGP3107 route. The ingress PE can then invalidate the BGP/policy route received from the EPE controller as the nhop of the BGP/Policy route is no longer valid. The ingress PE then falls back on its non-engineered best path to the destination. Notably, this BGP convergence process can occur without any dependency on the EPE controller (which may be faster and it more fault-tolerant, having no dependency on the EPE Controller's availability). Note further that the bgp auto-resolution feature avoids a BGP to BGP FIB recursion, and hence is better for performance. Moreover, the backward compatible mode does not require any new feature at the ingress PE (assuming the ingress PE supports double BGP recursion in FIB).

In embodiments where PeerGroup SIDs cannot be used with ingress PE-based resolution (intra-BGP or backward compatible), one viable solution is to allocate an IP address per PeerGroup such that this address can be used by the EPE controller to cause the correct resolution at the ingress PE.

While the above description makes general reference to IP, a primary focus on IPv4 addresses was used for the examples. The application to the native IPv6 Segment Routing use-case, however, is straightforward, and described here for clarity.

In particular, assuming the same reference diagram from FIG. 1, the following IPv6 addressing may be used:

C's interface to D: AAAA.BBBB.CCCC.0001.1::0/64;
D's interface to C: AAAA.BBBB.CCCC.0001.2::0/64;
C's interface to H: AAAA.BBBB.CCCC.0002.1::0/64;
H's interface to C: AAAA.BBBB.CCCC.0002.2::0/64;
C's link 1 (upper interface) to E: AAAA.BBBB.CCCC.0003.1::0/64;
E's link 1 (upper interface) to C: AAAA.BBBB.CCCC.0003.2::0/64;
C's link 2 (lower interface) to E: AAAA.BBBB.CCCC.0004.1::0/64;
E's link 2 (lower interface) to C: AAAA.BBBB.CCCC.0004.2::0/64;
Loopback of E used for eBGP multi-hop peering to C: AAAA.BBBB.CCCC.0005.2::0/64; and
C's loopback is AAAA.BBBB.CCCC.3333::0/64.

For C's BGP peering:
Single-hop eBGP peering with neighbor AAAA.BBBB.CCCC.0001.2::0 (D);
Single-hop eBGP peering with neighbor AAAA.BBBB.CCCC.0002.2::0 (H); and
Multi-hop eBGP peering with E on IP address AAAA.BBBB.CCCC.0005.2::0 (E).

Further, for C's resolution of the multi-hop eBGP session to E:
Static route AAAA.BBBB.CCCC.0005.2::0/128 via AAAA.BBBB.CCCC.0003.2::0; and
Static route AAAA.BBBB.CCCC.0005.2::0/128 via AAAA.BBBB.CCCC.0004.2::0.

Using this IPv6 addressing scheme for the BGP Peering Route example, for each eBGP peer, an IPv6 BGP route is advertised. The NLRI is the /128 address of the eBGP peer. The nature of the peer (single-hop or multi-hop) is encoded in an EPS attribute. As such, C advertises the following BGP IPv6 routes to describe its peers:

NLRI <AAAA.BBBB.CCCC.0001.2::0/128>, nhop AAAA.BBBB.CCCC.3333::0/128, AS Path {AS2}, EPS-Attribute{S=1, N=1};
NLRI <AAAA.BBBB.CCCC.0002.2::0/128>, nhop AAAA.BBBB.CCCC.3333::0/128, AS Path {AS3}, EPS-Attribute{S=1, N=1};
NLRI <AAAA.BBBB.CCCC.0005.2::0/128>, nhop AAAA.BBBB.CCCC.3333::0/128, AS Path {AS3}, EPS-Attribute{M=1, N=1};
NLRI <AAAA.BBBB.CCCC.0003.2::0/128, nhop AAAA.BBBB.CCCC.3333::0/128, AS Path {AS3}, EPS-Attribute{I=1, Multi-Hop=AAAA.BBBB.CCCC.0005.2::0, N=1}; and
NLRI <AAAA.BBBB.CCCC.0004.2::0/128, nhop AAAA.BBBB.CCCC.3333::0/128, AS Path {AS3}, EPS-Attribute{I=1, Multi-Hop=AAAA.BBBB.CCCC.0005.2::0, N=1}.

(Note that in embodiments where the PeerGroup SID is not supported for IPv6, a viable solution would consist in allocating an IP address to the group.)

To illustrate a simple policy enforced at a host, assume the following policy:
Policy: *Prefer via AS3, specifically link 2 to multi-hop ebgp peer E*
X programs host H with a static SR route to L/8 which pushes the SID list {AAAA.BBBB.CCCC.3333::0; AAAA.BBBB.CCCC.0004.2::0}

Conversely, to illustrate how that simple policy would be enforced at an ingress PE programmed with a BGP Policy route:

X programs the ingress PE by sending the following routes:
NLRI <L/8>, nhop AAAA.BBBB.CCCC.3333::0, AS Path {AS3, AS4}, high local-pref, SRT-Attr {AAAA.BBBB.CCCC.0004.1::0}.

(Note that the SRT-Attribute is a Source-Route Transparent attribute that will be understood by those skilled in the art.)

Figure 9:
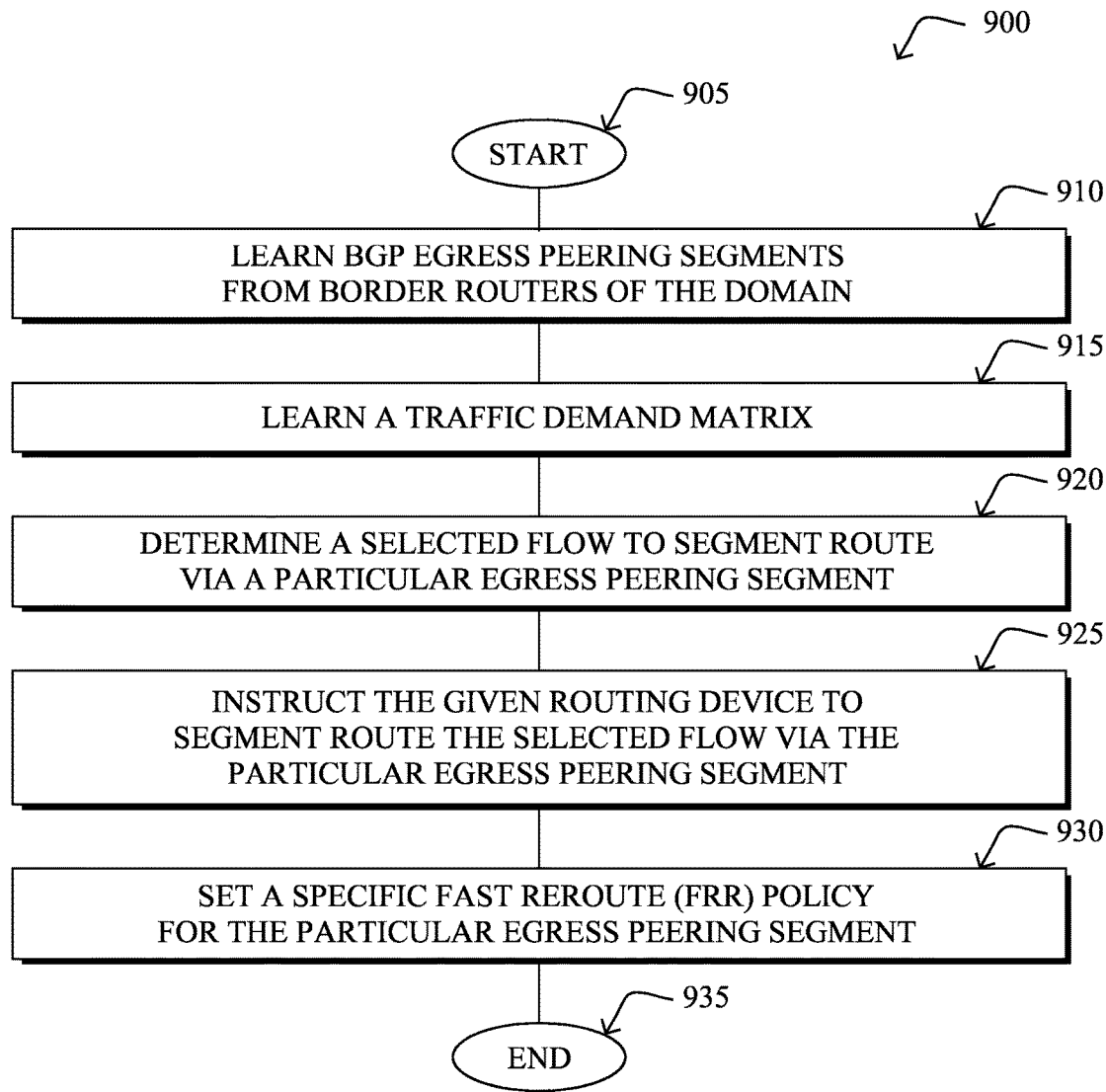
FIG. 9 illustrates an example simplified procedure for segment routing with egress peer engineering, particularly from the perspective of an EPE controller.

To demonstrate certain aspects of the techniques described above, FIG. 9 illustrates an example simplified procedure 900 for segment routing with egress peer engineering in accordance with the embodiments herein, particularly from the perspective of an EPE controller. The procedure 900 may begin at step 905 and continue on to step 910 where, as described in greater detail above, the EPE controller (e.g., X) may learn BGP egress peering segments from one or more border routers (e.g., egress PE C) of its domain (e.g., AS1). As noted above, this may be based on using an iBGP session, and possibly only with a subset of border routers of the domain (e.g., only those with interfaces configured for SR-EPE). As also mentioned, border routers may also participate in a first iBGP session with each other (e.g., a conventional iBGP session), such that this learning of the BGP egress peering segments from the one or more border routers may use a separate ("ship-in-the-night") iBGP session.

As detailed above, the BGP egress peering segments may comprise Peer Node segments that indicate segment routing to any interface of a corresponding peer device and Peer Adjacency segments that indicate segment routing to a specific interface of a corresponding peer device. In another embodiment, BGP egress peering segments further comprise Peer Group segments that indicate segment routing to any interface of a corresponding group of interfaces (e.g., to any interface of a particular peer AS).

In step 915, the controller device may also learn a traffic demand matrix, such as by using conventional traffic matrix techniques as mentioned above. Other information, such as policies, SLAs, etc., may also be learned by the controller device in a similar manner.

Based on the learned information from step 910 and optionally 915 above, the controller device may determine, in step 920, a selected flow to "segment route" via a particular egress peering segment (e.g., steer the selected flow via the particular egress peering, using the corresponding egress peering segment), where the selected flow is from a given routing device within the domain (e.g., content source/host or ingress border router/PE) to a given destination of a remote domain (e.g., L/8). As such, in step 925, the EPE controller device X can instruct the given routing device to segment route the selected flow via the particular egress peering segment. Note that as described above, when the routing device is an ingress border router, the instructing of step 925 may comprise setting an attribute within a routing advertisement that ensures selection by the ingress border router of the particular egress peering segment (e.g., high-local-pref).

Optionally, in step 930, the controller device may set a specific FRR policy for the particular egress peering segment.

The procedure 900 illustratively ends in step 935, though may continue to learn new information in steps 910 and 915, make new decisions in step 920, and so on.

Figure 10:
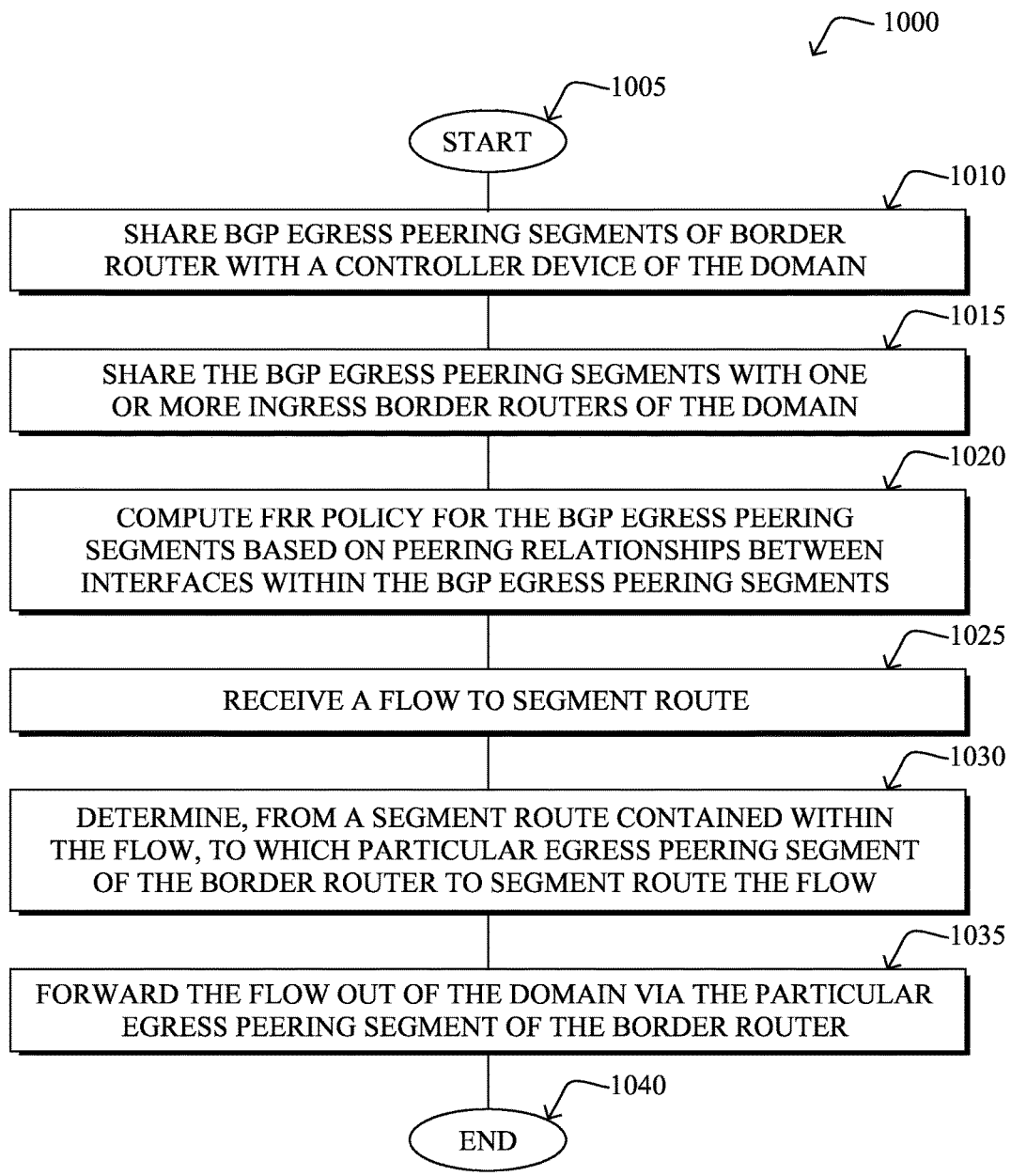
FIG. 10 illustrates an example simplified procedure for segment routing with egress peer engineering, particularly from the perspective of an EPE-enabled egress border router (egress PE)

In addition, FIG. 10 illustrates an example simplified procedure 1000 for segment routing with egress peer engineering in accordance with the embodiments herein, particularly from the perspective of an EPE-enabled egress border router (egress PE).

The procedure 1000 may begin at step 1005 and continue on to step 1010 where, as described in greater detail above, an egress border router (e.g., egress PE C) shares its BGP egress peering segments with a controller device (e.g., X) of its domain (e.g., AS1). Again, as noted above, the BGP egress peering segments may be shared with the controller device using an iBGP session (e.g., appending a steering attribute to BGP peering route advertisements to share the BGP egress peering segments). Optionally, in certain embodiments, the egress border router may also share the BGP egress peering segments with one or more ingress border routers of the domain in step 1015.

In step 1020, in certain embodiments, the egress border router may also compute (pre-compute) an FRR policy for its the BGP egress peering segments based on peering relationships between interfaces within the BGP egress peering segments, as described in greater detail above. Note that in another embodiment, a specific FRR policy may be externally set.

In step 1025, the egress border router may receive a packet flow to segment route, where the flow is from a given routing device (e.g., host or ingress PE) toward a given destination (e.g., L/8) of a remote domain. As such, in step 1030, the egress border router determines, from a segment route (segment list) contained within the flow, to which particular egress peering segment of the border router to segment route the flow. Accordingly, in step 1035, the egress border router may forward the flow out of the domain via the particular egress peering segment of the border router, and the procedure illustratively ends in step 1040. Note that though the procedure illustratively ends in step 1040, further updating to BGP egress peering segments may be made in steps 1010 and 1015, updated FRR policies may be computed in step 1020, and most likely, further packet flows may be received and forwarded in steps 1025-1035.

Figure 11:
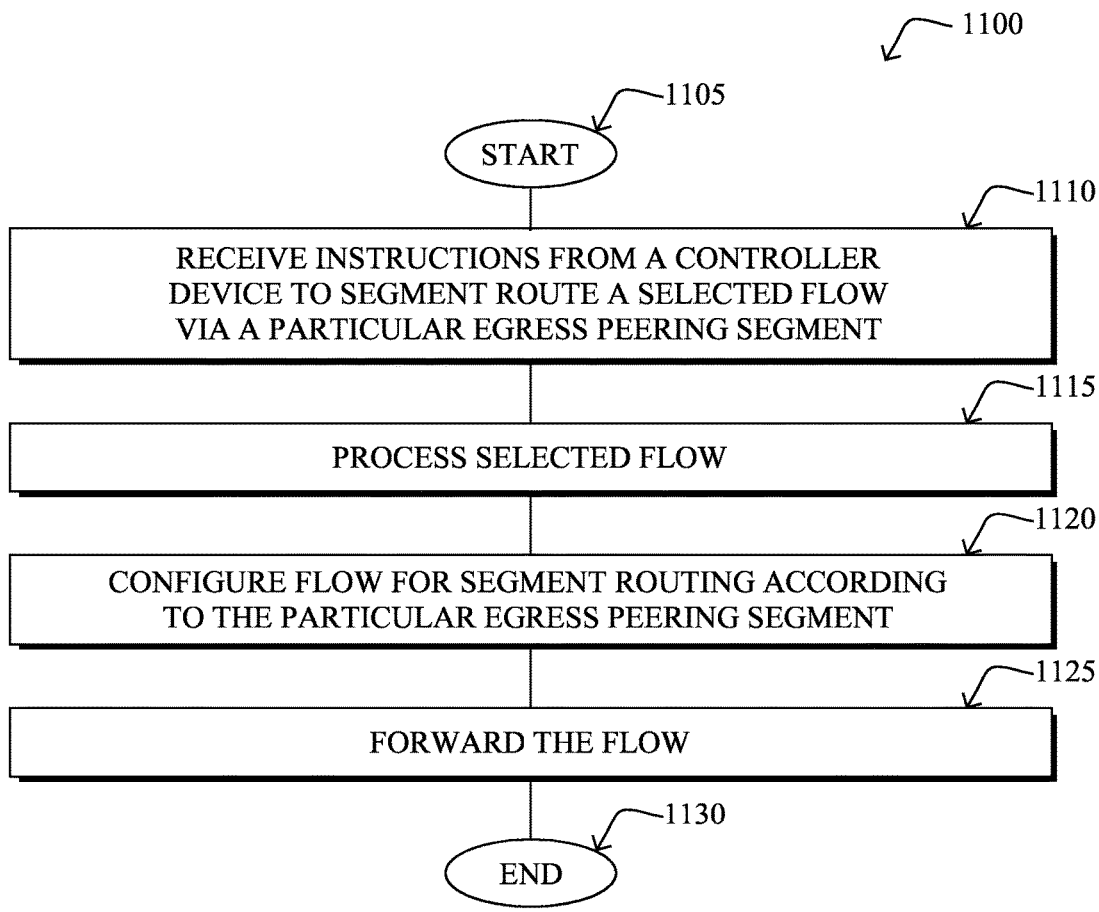
FIG. 11 illustrates an example simplified procedure for segment routing with egress peer engineering, particularly from the perspective of an EPE-controlled device, such as a content source/host or an ingress border router (ingress PE).

Lastly, FIG. 11 illustrates an example simplified procedure 1100 for segment routing with egress peer engineering in accordance with the embodiments herein, particularly from the perspective of an EPE-controlled device, such as a content source/host or an ingress border router (ingress PE). The procedure 1100 may begin at step 1105 and continue on to step 1110 where, as described in greater detail above, the routing device (e.g., host H or ingress PE A) receives instructions from the controller device to segment route a selected flow via a particular egress peering segment. As noted above, this instruction may be an explicit message, an application configuration, or a set attribute within a routing advertisement (e.g., to ingress PEs) that ensures selection of the particular egress peering segment. When processing that selected flow in step 1115, the routing device would thus configure the flow for segment routing according to the particular egress peering segment in step 1120, and forwards the flow in step 1125. The procedure 1100 illustratively ends in step 1130, optionally receiving updated instructions in step 1110 or processing and forwarding additional flows in steps 1115-1125. (Note also that where sharing of BGP egress peering segments occurs with ingress border routers of a domain, other features of the techniques herein become available to such ingress border routers, such as BGP-intra resolution.)

It should be noted that while certain steps within procedures 900-1100 may be optional as described above, the steps shown in FIGS. 9-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1100 are described separately, certain steps from each procedure may be incorporated into each other procedure, and the procedures are not meant to be mutually exclusive.

The techniques described herein provide for segment routing with egress peer engineering. In particular, the techniques herein define a solution and architecture for a centralized controller and distributed device behavior to traffic engineer the peering links of a routing domain (e.g., a content provider's AS). Specifically, the techniques herein meet all of the above-stated requirements, namely, internet routes unlabeled, next-hop self, incremental deployment, automated FRR, fast convergence, etc., unlike any other proposed techniques to date. (For example, a simple theoretical solution consists in running the Internet routes in a VRF, however this requires a prohibitive migration cost.)

The proposed solution herein offers a very granular and functional engineering toolbox, using PeerNode, PeerAdj, and PeerGroup to respectively steer traffic to a group of interfaces to a peer, a specific physical interface of a peer, and a group of interfaces across peers. Additionally, the techniques herein optimize fast reroute (FRR) and Fast-Convergence. Furthermore, the functionality of the above techniques allows for intra AS resolution over BGP by specifically marking and co-relating BGP routes, such that these routes may be retained in BGP only and need not be in the FIB for the route resolution.

Moreover, not all border routers require any new functionality (i.e., only the border routers with peering links to engineer need to participate), and any flow can be engineered separately, without creating any state at the P or egress PE nodes. The only node with a per-flow state is either the originating source host or the ingress PE. The fine-tuned control on BGP exit peering point selection is also made while preserving route-reflectors, and can be used with existing deployments (IPv4, IPv6, MPLS, etc.). That is, using the techniques described above, Internet routes may remain as IPv4 and IPv6 unlabeled, and a viable solution is also provided for MPLS.

Lastly, there is a massive growth of Distributed Content Points of Presence (PoPs), and hence with growth comes the requirement for scale and optimality. The techniques herein deliver on scale because of the inherent simplicity of SR and the careful peering route definition that minimizes state. The techniques also deliver on optimality thanks to the explicit steering capability of the newly defined PeerNode, PeerAdj and PeerGroup SIDs. SR-EPE allows over-the-top (OTT) providers to implement a software-defined network (SDN)-based control of their traffic distribution to their transit peers, where the control is centralized and application based, and the source of the route control is distributed down to the content source itself.

While there have been shown and described illustrative embodiments that provide for segment routing with egress peer engineering in computer networks, it is to be understood that various other adaptations and modifications may be made within the spirit and scope of the embodiments herein. For example, the embodiments have been shown and described herein with relation to particular network orientations (e.g., AS configurations, PE devices, etc.) and protocols (e.g., IP, MPLS, etc.). However, the embodiments in their broader sense are not as limited, and may, in fact, be used with other types of networks and/or protocols. For example, IPv4 and IPv6 are merely examples, and "IP" in general can refer to any Internet Protocol, such as any combination of IPv4 and IPv6 traffic, including IPv4-only, IPv6-only, and dual stack traffic.

Also, while certain other terminologies and descriptors are used, such as Node Descriptors and Peer Descriptors, other situations or architectures may call for different descriptors, such as Local Node Descriptors (e.g., BGP Router-ID, local ASN, BGP-LS Identifier) and Remote Node Descriptors (e.g., BGP Router-ID, peer ASN). Also, considerations for confederations (Member ASes) may also be included within the techniques herein without departing from the scope of the present disclosure.

Further, while single-segment routing is used, Segment Routing (SR) Tunnels may also be used to provide a list of segments to be pushed on the packets directed on the tunnel. The list of segments can be specified explicitly or implicitly via a set of abstract constraints (latency, affinity, SRLG, etc.). For instance, an SR tunnel can be used for traffic-engineering, OAM or FRR reasons.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    learning, by a controller device in a computer network domain, border gateway protocol (BGP) egress peering segments from one or more border routers of the domain, wherein BGP egress peering segments comprise Peer Node segments that indicate segment routing to any interface of a corresponding peer device and Peer Adjacency segments that indicate segment routing to a specific interface of a corresponding peer device;
    determining, by the controller device, a selected flow to segment route via a particular egress peering segment, the selected flow from a given routing device within the domain to a given destination of a remote domain; and
    instructing, by the controller device, the given routing device to segment route the selected flow via the particular egress peering segment.

2. The method as in claim 1, wherein BGP egress peering segments further comprise Peer Group segments that indicate segment routing to any interface of a corresponding group of interfaces.

3. The method as in claim 2, wherein Peer Group segments indicate segment routing to any interface of a particular peer autonomous system (AS).

4. The method as in claim 1, further comprising:
    learning, by the controller device, a traffic demand matrix; and
    determining, by the controller device, the selected flow to segment route via the particular egress peering segment based on the traffic demand matrix.

5. The method as in claim 1, further comprising:
    learning the BGP egress peering segments from the one or more border routers of the domain using an internal BGP (iBGP) session.

6. The method as in claim 5, wherein the one or more border routers participate in a first iBGP session with each other, and wherein learning the BGP egress peering segments from the one or more border routers of the domain uses a separate iBGP session.

7. The method as in claim 1, wherein the one or more border routers are a subset of all border routers of the domain.

8. The method as in claim 1, wherein routing device is a host device.

9. The method as in claim 1, wherein routing device is an ingress border router of the domain, and wherein instructing comprises:
    setting an attribute within a routing advertisement that ensures selection by the ingress border router of the particular egress peering segment.

10. The method as in claim 1, further comprising:
    setting, by the controller device, a specific fast reroute (FRR) policy for the particular egress peering segment.

11. A method, comprising:
    sharing, from a border router in a computer network domain with a controller device of the domain, border gateway protocol (BGP) egress peering segments of the border router, wherein BGP egress peering segments comprise Peer Node segments that indicate segment routing to any interface of a corresponding peer device and Peer Adjacency segments that indicate segment routing to a specific interface of a corresponding peer device;
    receiving, at the border router, a flow to segment route, the flow from a given routing device within the domain to a given destination of a remote domain;
    determining, from a segment route contained within the flow, to which particular egress peering segment of the border router to segment route the flow; and
    forwarding the flow out of the domain via the particular egress peering segment of the border router.

12. The method as in claim 11, wherein BGP egress peering segments further comprise Peer Group segments that indicate segment routing to any interface of a corresponding group of interfaces.

13. The method as in claim 11, further comprising:
    sharing the BGP egress peering segments with the controller device using an internal BGP (iBGP) session.

14. The method as in claim 13, further comprising:
    appending a steering attribute to BGP peering route advertisements to share the BGP egress peering segments.

15. The method as in claim 11, further comprising:
    sharing, from the border router, the BGP egress peering segments with one or more ingress border routers of the domain.

16. The method as in claim 11, further comprising:
    computing, by the border router, a fast reroute (FRR) policy for the BGP egress peering segments of the border router based on peering relationships between interfaces within the BGP egress peering segments.

17. An apparatus, comprising:
one or more network interfaces to communicate with a computer network domain as a controller device in the domain;
a processor coupled to the one or more network interfaces and configured to execute a process; and
a memory configured to store the process executable by the processor, the process when executed operable to:
learn border gateway protocol (BGP) egress peering segments from one or more border routers of the domain, wherein BGP egress peering segments comprise Peer Node segments that indicate segment routing to any interface of a corresponding peer device and Peer Adjacency segments that indicate segment routing to a specific interface of a corresponding peer device;
determine a selected flow to segment route via a particular egress peering segment, the selected flow from a given routing device within the domain to a given destination of a remote domain; and
instruct the given routing device to segment route the selected flow via the particular egress peering segment.

18. The apparatus as in claim 17, wherein BGP egress peering segments further comprise Peer Group segments that indicate segment routing to any interface of a corresponding group of interfaces.

19. An apparatus, comprising:
one or more network interfaces to communicate with a computer network domain as a border router in the domain;
a processor coupled to the one or more network interfaces and configured to execute a process; and
a memory configured to store the process executable by the processor, the process when executed operable to:
share, with a controller device of the domain, border gateway protocol (BGP) egress peering segments of the border router, wherein BGP egress peering segments comprise Peer Node segments that indicate segment routing to any interface of a corresponding peer device and Peer Adjacency segments that indicate segment routing to a specific interface of a corresponding peer device;
receive a flow to segment route, the flow from a given routing device within the domain to a given destination of a remote domain;
determine, from a segment route contained within the flow, to which particular egress peering segment of the border router to segment route the flow; and
forward the flow out of the domain via the particular egress peering segment of the border router.

20. The apparatus as in claim 19, wherein BGP egress peering segments further comprise Peer Group segments that indicate segment routing to any interface of a corresponding group of interfaces.

21. A system, comprising:
a controller device in a computer network domain;
one or more egress border routers of the domain; and
a routing device of the domain;
wherein the controller device is configured to:
a) learn border gateway protocol (BGP) egress peering segments from the one or more border routers, wherein BGP egress peering segments comprise Peer Node segments that indicate segment routing to any interface of a corresponding peer device and Peer Adjacency segments that indicate segment routing to a specific interface of a corresponding peer device,
b) determine a selected flow to segment route via a particular egress peering segment, the selected flow from the routing device within the domain to a given destination of a remote domain, and
c) instruct the routing device to segment route the selected flow via the particular egress peering segment; and
wherein a particular border router of the one or more egress border routers is configured to:
a) receive the selected flow to segment route,
b) determine, from a segment route contained within the selected flow, to which particular egress peering segment of the particular border router to segment route the flow, and
c) forward the flow out of the domain via the particular egress peering segment of the particular border router.

* * * * *